US008239174B2

(12) United States Patent
Demizu et al.

(10) Patent No.: US 8,239,174 B2
(45) Date of Patent: Aug. 7, 2012

(54) METHOD FOR DISPOSING A COMPONENT PART WHILE TAKING INTO ACCOUNT A POSITIONAL RELATIONSHIP BETWEEN THE COMPONENT PART AND OTHER INSTALLED OBJECTS EXISTING WITHIN A SPACE

(75) Inventors: Kouji Demizu, Kawasaki (JP); Masayuki Kidera, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/064,923

(22) Filed: Apr. 26, 2011

(65) Prior Publication Data
US 2011/0202320 A1 Aug. 18, 2011

Related U.S. Application Data

(63) Continuation of application No. PCT/JP2008/069630, filed on Oct. 29, 2008.

(51) Int. Cl.
*G06F 17/50* (2006.01)
*G06F 17/00* (2006.01)
*G06G 7/48* (2006.01)
*G06T 15/00* (2011.01)
*G06T 17/00* (2006.01)
*G09G 5/00* (2006.01)
(52) U.S. Cl. .............. 703/1; 703/7; 345/418; 345/419; 345/420; 345/652; 345/663
(58) Field of Classification Search ............... 703/1, 7; 345/418, 419, 420, 652, 663
See application file for complete search history.

(56) References Cited

U.S. PATENT DOCUMENTS

| 7,068,268 | B2 * | 6/2006 | Kubota et al. | 345/419 |
| 7,529,638 | B2 * | 5/2009 | Sawai et al. | 702/150 |
| 7,629,972 | B2 * | 12/2009 | Yoo et al. | 345/420 |
| 2003/0020711 | A1 * | 1/2003 | Sakakura et al. | 345/420 |

FOREIGN PATENT DOCUMENTS
JP 2002-056040 2/2002
(Continued)

OTHER PUBLICATIONS

Patent Abstracts of Japan, Publication No. 2002-056040, Published Feb. 20, 2002.

(Continued)

*Primary Examiner* — Kandasamy Thangavelu
*Assistant Examiner* — Nithya Janakiraman
(74) *Attorney, Agent, or Firm* — Staas & Halsey LLP

(57) ABSTRACT

In a design support apparatus, a storage unit stores location data of an assembly including a first member long and flexible and a second member connected to the first member and having a larger cross-sectional shape than that of the first member within a product, and respective positions of installed objects. A geometric center calculation unit virtually extends straight lines from a point on a route along which the first member passes, radially in directions normal to a tangential direction of the route, virtually positions points where the straight lines come into contact with the installed objects, and calculates a geometric center from the positioned points. A route change unit changes the route such that the first member passes the calculated geometric center. A verification unit verifies whether or not the assembly interferes with any of the installed objects during passage of the first member along the changed route.

11 Claims, 27 Drawing Sheets

FOREIGN PATENT DOCUMENTS

| | | |
|---|---|---|
| JP | 2005-258643 | 9/2005 |
| JP | 2006-134297 | 5/2006 |
| JP | 2006-301953 | 11/2006 |
| JP | 2006-330825 | 12/2006 |
| WO | WO 2008/041362 | 4/2008 |

OTHER PUBLICATIONS

Patent Abstracts of Japan, Publication No. 2005-258643, Published Sep. 22, 2005.

Patent Abstracts of Japan, Publication No. 2006-134297, Published May 25, 2006.

Patent Abstracts of Japan, Publication No. 2006-301953, Published Nov. 2, 2006.

Patent Abstracts of Japan, Publication No. 2006-330825, Published Dec. 7, 2006.

English Abstract of WO 2008/041362, Published Apr. 10, 2008 (included in AE).

* cited by examiner

HARNESS ROUTE INFORMATION MANAGEMENT TABLE

110b

| Point001 | | | | | | | |
|---|---|---|---|---|---|---|---|
| CHECK POINT (RELAY POINT) NUMBER | 1 | 1-1 | 1-2 | 2 | ... | 3 | 4 |
| ABSOLUTE COORDINATE POSITION (X,Y,Z) | 0,0,3.5 | 6,0,3.5 | 12,0,3.5 | 50,0,3.5 | ... | 70,-20,3.5 | 70,-20,3.5 |
| PASSING DIRECTION RX (VECTOR) | 1.0 | 1.0 | 1.0 | 1.0 | ... | 0.7 | 1.0 |
| PASSING DIRECTION RY (VECTOR) | 0 | 0 | 0 | 0 | ... | -0.7 | 0 |
| PASSING DIRECTION RZ (VECTOR) | 0 | 0 | 0 | 0 | ... | 0 | 0 |
| CONNECTOR ATTITUDE (RX,RY,RZ) | 0,1,0,0 | - | - | - | ... | - | - |

FIG. 8

122a CONTOUR SHAPE MANAGEMENT TABLE

| | X SIZE | Y SIZE | DIAGONAL DISTANCE | CENTER POSITION |
|---|---|---|---|---|
| CONTOUR SHAPE #1 | 70 | 7 | 70.3 | 35,3.5 |
| CONTOUR SHAPE #2 | 70 | 78 | 104.8 | 35,39 |
| CONTOUR SHAPE #3 | 7 | 78 | 78.3 | 3.5,39 |

FIG. 9

124a GEOMETRIC CENTER INFORMATION MANAGEMENT TABLE

| CHECK POINT (RELAY POINT) NUMBER | 1 | 1-1 | 1-2 | 2 | ... | 3 | ... | 4 |
|---|---|---|---|---|---|---|---|---|
| RELATIVE POSITION #1 (X1,Y1) | 70.3,0.0 | 70.3,0.0 | 70.3,0.0 | 70.3,0.0 | ... | 15.0,0.0 | ... | 70.3,0.0 |
| RELATIVE POSITION #2 (X2,Y2) | 49.7,49.7 | 49.7,49.7 | 49.7,49.7 | 49.7,49.7 | ... | 15.0,15.0 | ... | 49.7,49.7 |
| RELATIVE POSITION #3 (X3,Y3) | 0.0,70.3 | 0.0,70.3 | 0.0,70.3 | 0.0,70.3 | ... | 0.0,70.3 | ... | 0.0,70.3 |
| RELATIVE POSITION #4 (X4,Y4) | -49.7,49.7 | -49.7,49.7 | -49.7,49.7 | -49.7,49.7 | ... | -49.7,49.7 | ... | -49.7,49.7 |
| RELATIVE POSITION #5 (X5,Y5) | -70.3,0.0 | -70.3,0.0 | -70.3,0.0 | -10.0,0.0 | ... | -7.0,0.0 | ... | -70.3,0.0 |
| RELATIVE POSITION #6 (X6,Y6) | -3.5,-3.5 | -3.5,-3.5 | -3.5,-3.5 | -3.5,-3.5 | ... | -3.5,-3.5 | ... | -3.5,-3.5 |
| RELATIVE POSITION #7 (X7,Y7) | 0.0,-3.5 | 0.0,-3.5 | 0.0,-3.5 | 0.0,-3.5 | ... | 0.0,-3.5 | ... | 0.0,-3.5 |
| RELATIVE POSITION #8 (X8,Y8) | 3.5,-3.5 | 3.5,-3.5 | 3.5,-3.5 | 3.5,-3.5 | ... | 3.5,-3.5 | ... | 3.5,-3.5 |
| RELATIVE POSITION (X,Y) to GEOMETRIC CENTER | 0.0,27.2 | 0.0,27.2 | 0.0,27.2 | 12.0,30.6 | ... | -10.8,33.8 | ... | 0.0,27.2 |
| CONTOUR SHAPE ATTITUDE (RX,RY) | 1.0,0.0 | 1.0,0.0 | 1.0,0.0 | 1.0,0.0 | ... | 1.0,0.0 | ... | 1.0,0.0 |

FIG. 10

INTERFERENCE POINT INFORMATION MANAGEMENT TABLE
124b

| CHECK POINT (RELAY POINT) NUMBER | 1 | 1-1 | 1-2 | 2 | ... | 3 | ... | 4 |
|---|---|---|---|---|---|---|---|---|
| RELATIVE POSITION #11 (X11, Y11) | NOT EXISTS | NOT EXISTS | EXISTS | NOT EXISTS | ... | NOT EXISTS | ... | NOT EXISTS |
| RELATIVE POSITION #12 (X12, Y12) | NOT EXISTS | NOT EXISTS | NOT EXISTS | NOT EXISTS | ... | NOT EXISTS | ... | NOT EXISTS |
| RELATIVE POSITION #13 (X13, Y13) | NOT EXISTS | NOT EXISTS | NOT EXISTS | NOT EXISTS | ... | NOT EXISTS | ... | NOT EXISTS |
| RELATIVE POSITION #14 (X14, Y14) | NOT EXISTS | NOT EXISTS | NOT EXISTS | NOT EXISTS | ... | NOT EXISTS | ... | NOT EXISTS |
| RELATIVE POSITION #15 (X15, Y15) | NOT EXISTS | EXISTS | NOT EXISTS | NOT EXISTS | ... | NOT EXISTS | ... | NOT EXISTS |
| RELATIVE POSITION #16 (X16, Y16) | NOT EXISTS | NOT EXISTS | NOT EXISTS | NOT EXISTS | ... | NOT EXISTS | ... | NOT EXISTS |
| RELATIVE POSITION #17 (X17, Y17) | NOT EXISTS | NOT EXISTS | EXISTS | NOT EXISTS | ... | NOT EXISTS | ... | NOT EXISTS |
| RELATIVE POSITION #18 (X18, Y18) | NOT EXISTS | NOT EXISTS | NOT EXISTS | NOT EXISTS | ... | NOT EXISTS | ... | NOT EXISTS |
| NUMBER (TOTAL) OF INTERFERENCE POINTS | 0 | 1 | 2 | 0 | ... | 0 | ... | 0 |

127a GEOMETRIC CENTER ROUTE INFORMATION MANAGEMENT TABLE

| CHECK POINT | 1 | 2 | 3 | 4 |
|---|---|---|---|---|
| ABSOLUTE COORDINATE POSITION (X,Y,Z) | 0,0,30.7 | 50,12.0,34.1 | 62.4,−27.6,37.3 | 100,−20,30.7 |
| PASSING DIRECTION RX (VECTOR) | 1.0 | 1.0 | 0.7 | 1.0 |
| PASSING DIRECTION RY (VECTOR) | 0 | 0 | −0.7 | 0 |
| PASSING DIRECTION RZ (VECTOR) | 0 | 0 | 0 | 0 |
| CONNECTOR ATTITUDE (RX,RY,RZ) | 0,1,0,0 | 0,1,0,0 | 0.7,−0.7,0 | 0,1,0,0 |
| EMPTY SPACE | EXISTS | EXISTS | EXISTS | EXISTS |

METHOD FOR DISPOSING A COMPONENT PART WHILE TAKING INTO ACCOUNT A POSITIONAL RELATIONSHIP BETWEEN THE COMPONENT PART AND OTHER INSTALLED OBJECTS EXISTING WITHIN A SPACE

This application is a continuing application, filed under 35 U.S.C. §111(a), of International Application PCT/JP2008/069630, filed on Oct. 29, 2008.

FIELD

The embodiment discussed herein is related to a computer-readable medium storing design support program, a design support method, and a design support apparatus.

BACKGROUND

Recently, to design the structure of an apparatus, there has been proposed a technique of verifying the layout of component parts within the apparatus using three-dimensional data, i.e. virtual space data.

This technique makes it possible to verify the layout of component parts in advance at a design stage instead of creating a prototype and performing verification thereon, which contributes to developing products in a shorter time period.

Japanese Laid-Open Patent Publication No. 2002-56040
Japanese Laid-Open Patent Publication No. 2005-258643
Japanese Laid-Open Patent Publication No. 2006-134297
Japanese Laid-Open Patent Publication No. 2006-301953

Now, there is an increasing need to apply the above-mentioned pre-verification performed using three-dimensional data not only to the arrangement of non-deformable component parts, but also to the layout of component parts having flexibility (hereinafter referred to as "flexible objects") such as cord-like or band-like cables.

In the case of performing pre-verification on a flexible object, first, a route along which the flexible object passes is created (determined) and then the verification is performed along the route.

However, in a case where a non-deformable component part, such as a connector, is connected to the flexible object, it is not easy to determine, in a state where the flexible object has been disposed (routed) in an apparatus, whether or not a space for routing the flexible object is secured.

For this reason, if the verification is performed in a state without a connector to determine the route for the flexible object, there is a problem that when the flexible object is actually routed along the route, it may turn out to be impossible to pass the flexible object due to interference of the connector connected to the flexible object with another structure existing in the vicinity of the route.

Therefore, it has been necessary to separately manually verify whether or not the flexible object having the connector connected thereto can actually be routed along the designated route.

SUMMARY

According to an aspect of the invention, there is provided a computer-readable medium storing a design support program for causing a computer to perform processing for disposing a component part while taking into account a positional relationship between the component part and other installed objects existing within a space, when designing a layout within the space, wherein the design support program causes the computer to function as a storage unit configured to store location data of positions, in the space, of an assembly including a first member which is long and flexible and a second member connected to the first member and having a larger cross-sectional shape than a cross-sectional shape of the first member, and location data of respective positions of the installed objects in the space, a geometric center calculation unit configured to virtually extend straight lines from a point on a route along which the first member passes, radially in directions normal to a tangential direction of the route, virtually position a group of a plurality of points at locations where the straight lines come into contact with the installed objects, and calculate a geometric center from the group of the positioned points, a route change unit configured to change the route such that the first member passes the geometric center calculated by the geometric center calculation unit, and a verification unit configured to verify whether or not the assembly interferes with any of the installed objects during passage of the first member along the route changed by the route change unit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 8 illustrates harness route information;

FIG. 9 illustrates contour shape information;

FIG. 10 illustrates geometric center information;

FIG. 11 illustrates interference point information;

FIG. 12 illustrates geometric center route information;

DESCRIPTION OF EMBODIMENTS

Figure 1:
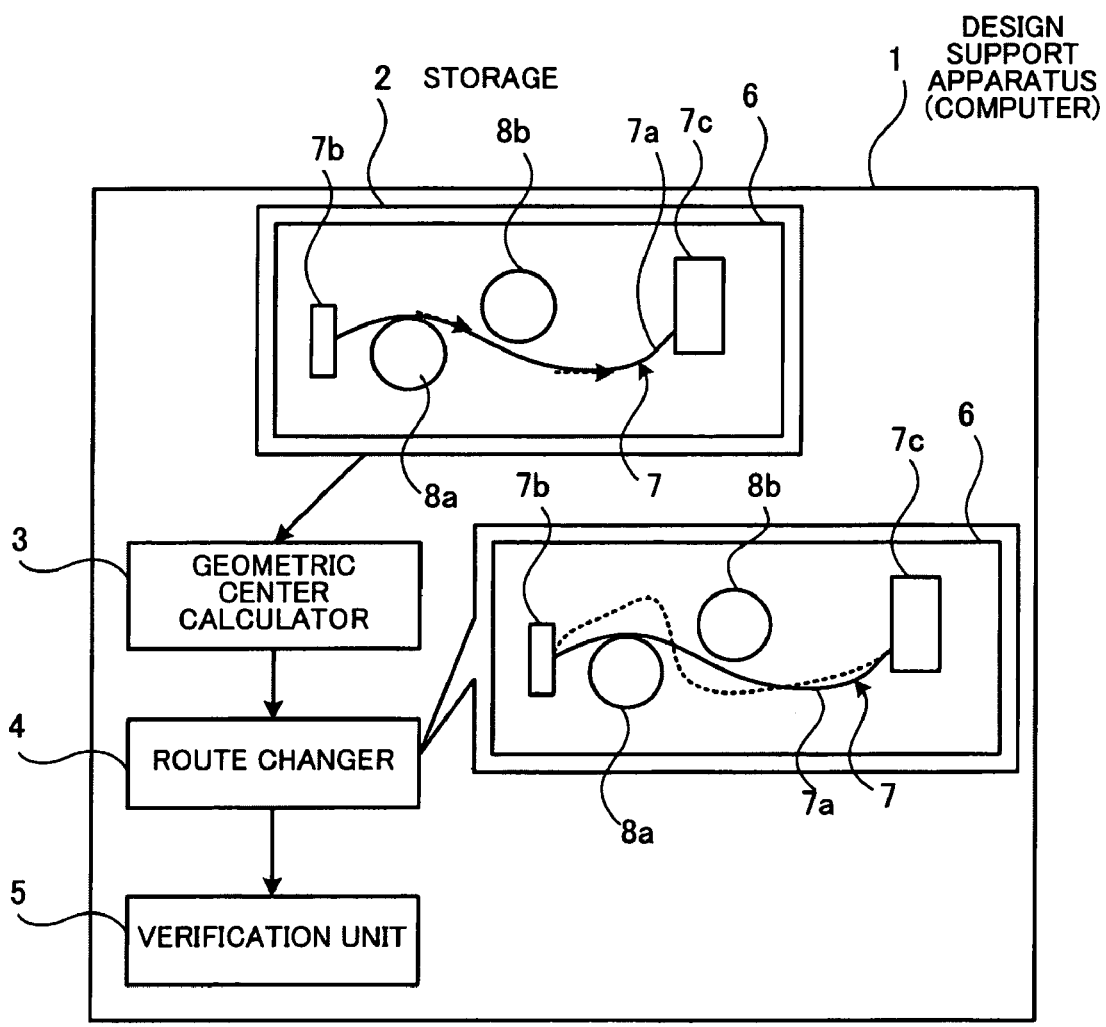
FIG. 1 illustrates the outline of a design support apparatus according to an embodiment.

An embodiment of the present invention will be explained below with reference to the accompanying drawings, wherein like reference numerals refer to like elements throughout.

First, a description will be given of the outline of a design support apparatus according to the embodiment, and then the embodiment will be described in more detail.

FIG. 1 illustrates the outline of the design support apparatus according to the embodiment.

In designing a layout of component parts within a space, the design support apparatus (computer) 1 performs processing for laying out the component parts while taking into account the positional relationship with other installed objects existing in the space.

The design support apparatus 1 comprises a storage 2, a geometric center calculator 3, a route changer 4, and a verification unit 5.

The storage 2 stores location data of an assembly (component part) 7 in a product 6, and location data of installed objects 8a and 8b.

The assembly 7 comprises a first member 7a having a long length and flexibility, and second members 7b and 7c each connected to the first member 7a and having a cross-sectional shape larger than that of the first member 7a.

The first member 7a has a linear shape, a cord shape, or a band shape, for example.

Although in FIG. 1, the second members 7b and 7c are disposed at the respective opposite ends of the first member 7a, this is not limitative, but the second members 7b and 7c may be disposed at respective intermediate portions of the first member 7a.

The geometric center calculator 3 virtually positions a group of a plurality of points at respective locations where radial lines extending from a point on a route along which the first member 7a passes in normal directions to a tangential direction of the point on the route (direction indicated by a dotted line in FIG. 1) come into contact with the installed object 8a or 8b, and calculates a geometric center (the center of gravity on a two-dimensional cross section) from the group of the positioned points.

This processing may be performed at each of desired points on the route (e.g. only at points close to the respective installed objects 8a and 8b), or at intervals of a predetermined distance along the entire route.

The route changer 4 changes a route such that the first member 7a passes geometric centers calculated by the geometric center calculator 3. In FIG. 1, a changed route is indicated by a dotted line.

The verification unit 5 verifies whether or not the second member 7b or the second member 7c interferes with the installed object 8a or 8b when the first member 7a is moved along the route changed by the route changer 4. For example, when it is desired to move the second member 7c from a location leftward of the installed objects 8a and 8b as viewed in FIG. 1, to a location rightward of these as viewed in FIG. 1, (i.e. a location illustrated in FIG. 1), the verification unit 5 verifies whether or not the second member 7c interferes with the installed object 8a or 8b while being moved along the changed route.

According to the design support apparatus 1 configured as above, it is possible to easily create a route having a high possibility that the second member 7b or the second member 7c can pass between the installed objects 8a and 8b, as illustrated in FIG. 1. Further, by verifying whether or not interference occurs if a route has been changed, it is possible to easily check whether or not there is a route along which the flexible member can be disposed, when designing the layout of a flexible member, such as the assembly 7.

In the following, the embodiment will be described in more detail.

Figure 2:
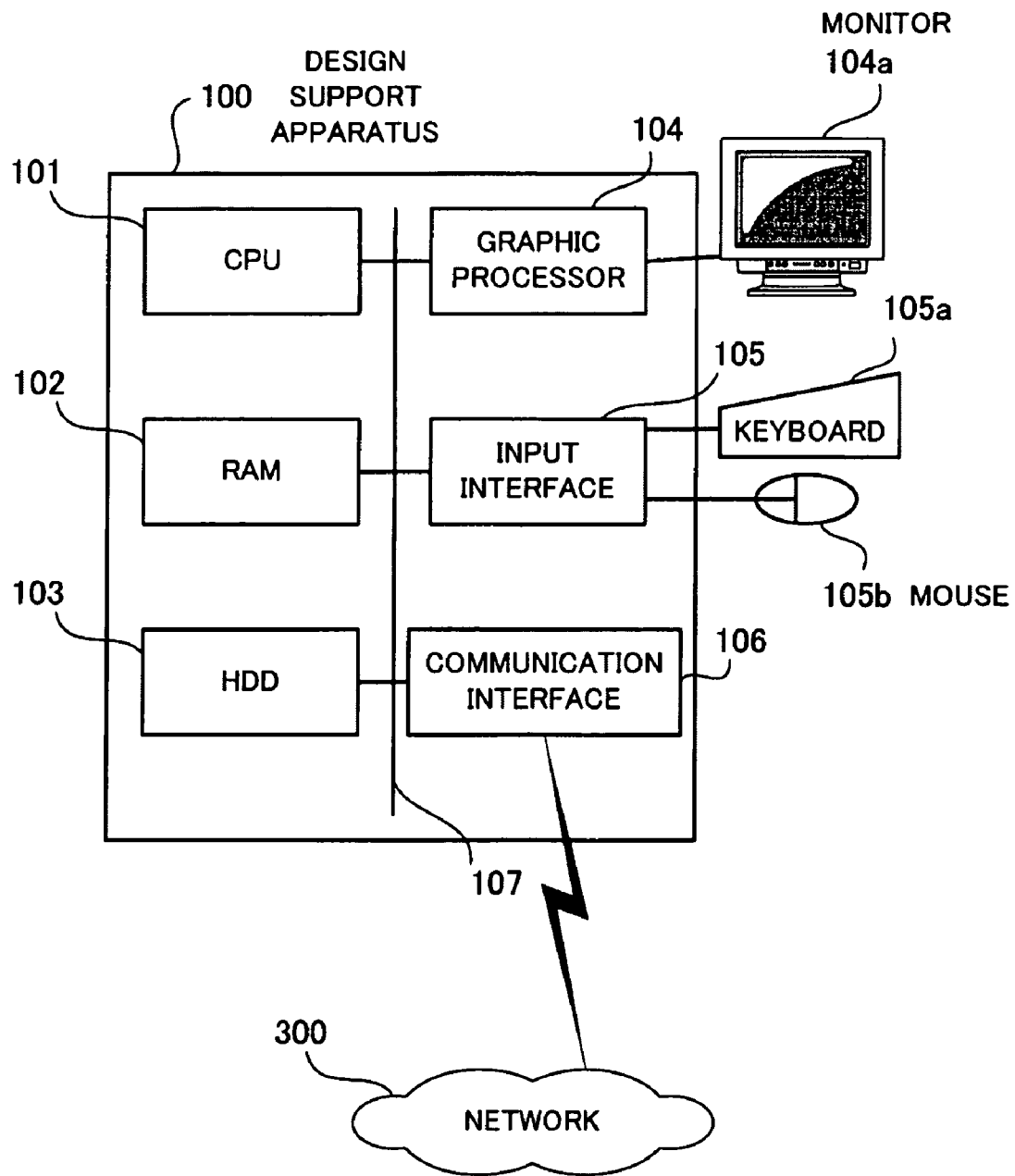
FIG. 2 illustrates an example of the hardware configuration of the design support apparatus.

FIG. 2 illustrates the hardware configuration of the design support apparatus.

The design support apparatus 100 has its overall operation controlled by a CPU (Central Processing Unit) 101. Connected to the CPU 101 via a bus 107 are a RAM (Random Access Memory) 102, a HDD (Hard Disk Drive) 103, a graphic processor 104, an input interface 105, and a communication interface 106.

The RAM 102 temporarily stores at least part of an OS (Operating System) program and application programs to be executed by the CPU 101. Further, the RAM 102 stores various kinds of data required for processing by the CPU 101. The HDD 103 stores the OS program and the application programs. Further, program files are stored in the HDD 103.

Connected to the graphic processor 104 is a monitor 104a. The graphic processor 104 displays images on the display screen of the monitor 104a in response to commands from the CPU 101. A keyboard 105a and a mouse 105b are connected to the input interface 105. The input interface 105 transfers signals from the keyboard 105a or the mouse 105b to the CPU 101 via the bus 107.

The communication interface 106 is connected to a network 300. The communication interface 106 exchanges data with other computers via the network 300. It can be envisaged that the communication interface 106 is implemented e.g. by a network communication card or a modem.

The hardware configured as above makes it possible to realize processing functions of the present embodiment.

Figure 3:
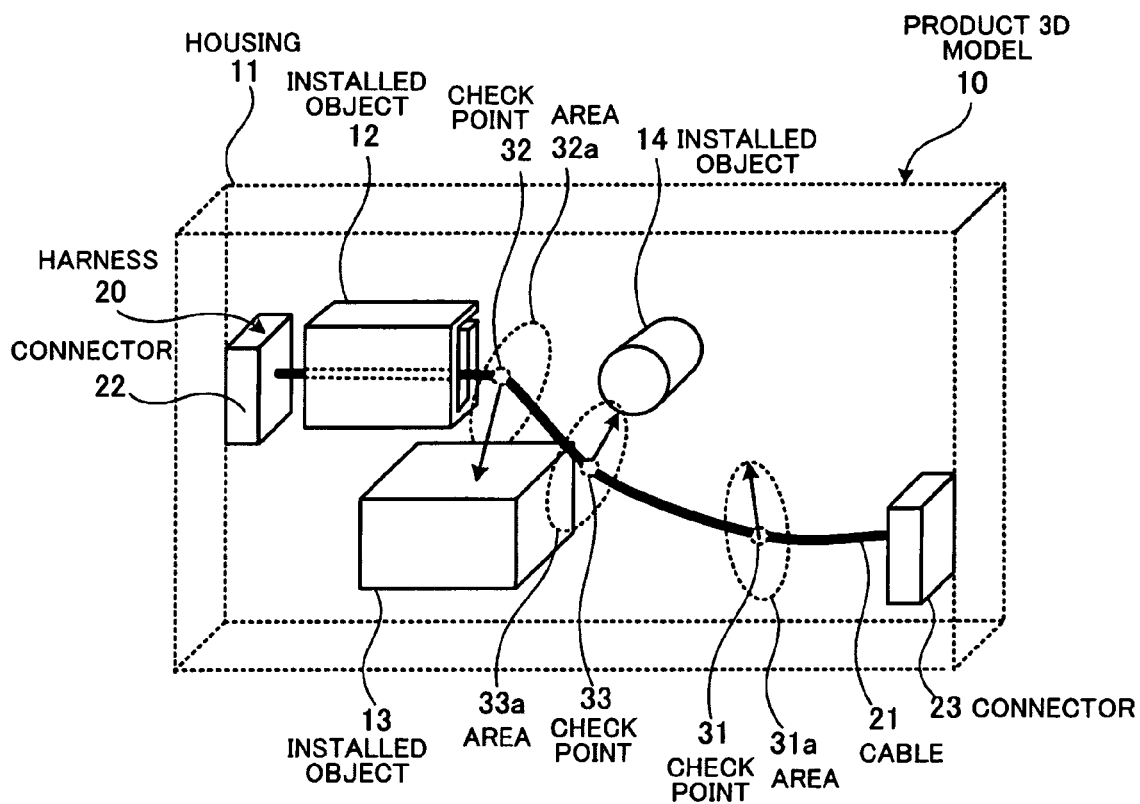
FIG. 3 illustrates an example of a product 3D model displayed on a monitor.

FIG. 3 illustrates an example of a product 3D model displayed on the monitor.

The product 3D model 10 displayed on the monitor 104a comprises a housing 11, installed objects 12, 13, and 14 installed within the housing 11, and a harness (assembly) 20 installed within the housing 11.

The harness 20 comprises a flexible cable (first member) 21 and connectors (second members) 22 and 23 connected to the respective opposite ends of the cable 21 and each having a larger cross-sectional shape than that of the cable 21.

It should be noted that a route (initial route) along which the cable 21 passes is determined in advance, and the cable 21 is disposed along the initial route.

The design support apparatus 100 determines whether or not the harness 20 can pass through a space defined by the installed objects 12 to 14 (and other spaces) and a route along which the harness 20 passes, by taking into account the positional relationship between the harness 20 and the installed objects 12 to 14.

For example, in the case of the product 3D model 10, areas 31a, 32a, and 33a are taken into account which have check points 31, 32, and 33 on the current route for the cable 21 as respective centers thereof. Each of the check points is set in advance e.g. by a designer, as a point where, the designer is afraid, an interference may occur with any of the installed objects 12 to 14 due to the structure of the product 3D model 10.

There are no installed objects disposed around the area 31a, and therefore the designer can determine that it is possible to pass the connector 23 through the area 31a. However, it is difficult for the designer to visually determine whether or not the connector 23 interferes with the installed object 13 in the area 32a, whether or not the connector 23 interferes with the installed object 14 in the area 33a, or whether or not, in case of occurrence of an interference, the connector 23 can be passed by changing the current route (i.e. while avoiding interference).

Therefore, the design support apparatus 100 executes processing described below, to determine whether or not the connector 23 can be passed through the space defined by the installed objects 12 to 14, and displays a result of the determination on the monitor 104a. Further, when it is necessary to change the route, a route for a change is also displayed on the monitor 104a. This provides the designer with information enabling him/her to make an easy check of whether or not there is a route for disposing the harness 20 in the apparatus.

In the following, the functions of the design support apparatus 100 will be described by taking an example of a case where the product 3D model 10 is processed, but it is to be understood that a model which can be processed by the design support apparatus 100 is not limited to the product 3D model 10.

Next, a description will be given of the functions provided in the design support apparatus 100 so as to perform designing by a system having the hardware configured as illustrated in FIG. 2.

Figure 4:
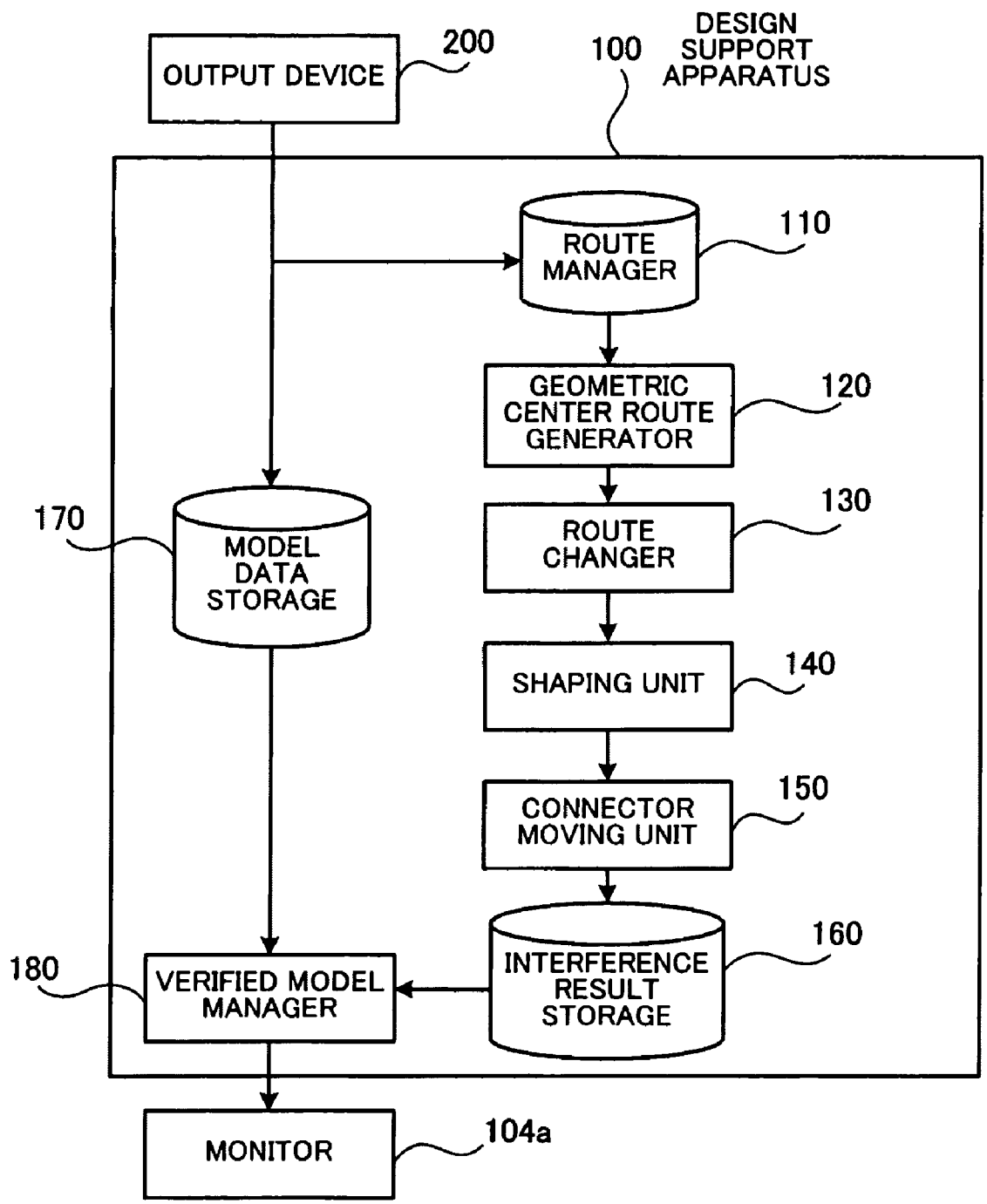
FIG. 4 is a functional block diagram of the design support apparatus.

FIG. 4 is a functional block diagram of the design support apparatus.

The design support apparatus 100 comprises a route manager 110, a geometric center route generator 120, a route changer 130, a shaping unit 140, a connector (structure) moving unit 150, an interference result storage 160, a model data storage 170, and a verified model manager 180.

The route manager 110 manages information (harness information) concerning the shape of the harness 20 and information (harness route information) concerning a route (initial route) along which the harness 20 is routed in the housing 11.

As illustrated in FIG. 3, the route is formed by a combination of curves or one or more straight lines, and at least one check point is set on a curve or straight line as a component of the route.

Further, between check points on the route, points (hereinafter referred to "relay points") are set which are virtually determined at predetermined space intervals (e.g. at a pitch of the diameter of the cable 21).

Figure 5:
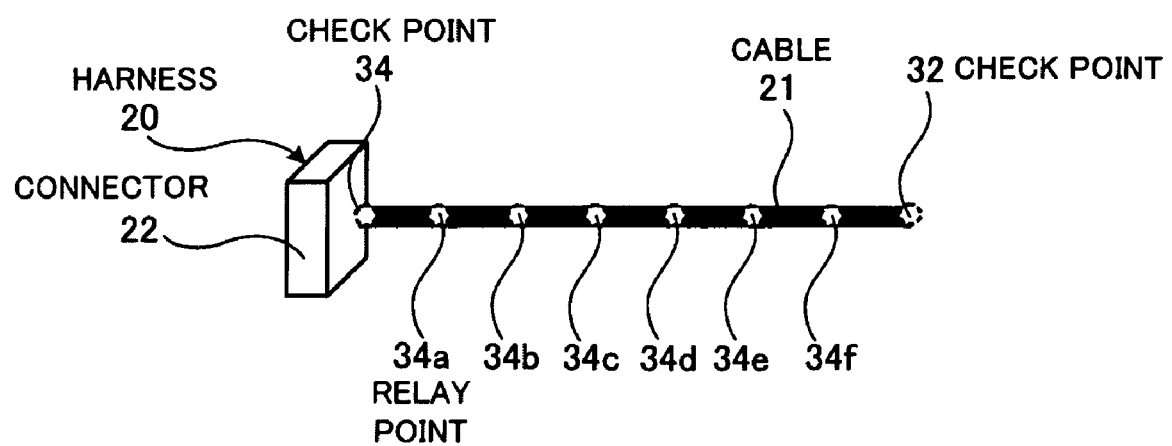
FIG. 5 illustrates relay points.

FIG. 5 illustrates relay points.

In a case where a connection point of the connector 22 and the cable 21 is set as a check point 34, the cable 21 extends to a check point 32 via relay points 34a to 34f arranged at predetermined space intervals, as illustrated in FIG. 5. In the following description, the check points and the relay points will also be generically referred to as "way points".

Referring again to FIG. 4, the geometric center route generator 120 generates a route along which the cable 21 passes, while taking the installed objects 12 to into account. Specifically, a geometric center (position of the gravity center of a polygon) at each way point is calculated based on the relationship between the cable 21 and the installed objects 12 to 14, whereby a geometric center (center position) where the cable 21 is to pass is determined. A method of determining a geometric center will be described in detail hereinafter.

Further, the geometric center route generator 120 determines a cross-sectional direction and an attitude of a contour shape (referred to hereinafter) assumed by the connector 23 when the cable 21 passes a geometric center at each way point, and stores the data.

The route changer 130 arranges the geometric center points generated by the geometric center route generator 120, in order, and changes (redefines) the route such that the cable 21 passes the geometric center points.

The shaping unit 140 forms a shape by connecting a group of points (referred to hereinafter) positioned by the geometric center route generator 120 so as to calculate a geometric center.

Specifically, the shaping unit 140 connects points on radial lines about a check point on the changed route in a predetermined direction around the cable 21 with respect to an extending direction of the cable 21, whereby a figure formed by a locus of points is created. Further, the same processing is carried out at an adjacent check point to thereby create a figure formed by a locus of points by connecting points on radial lines is created. Then, a shape is created between the figures.

The connector moving unit 150 moves the connector 23 along the route changed by the route changer 130.

Specifically, the connector moving unit 150 uses cross-sectional directions and contour shape attitudes of the connector 23 assumed at respective adjacent way points and thereby performs linear interpolation between points linearly changed according to the differences between the points. A method of linear interpolation will be described in detail hereinafter.

The interference result storage 160 stores results of interferences that occur between the connector 23 and the installed objects 12 to 14 when the connector 23 is moved along the route to which the connector moving unit 150 has changed.

The model data storage 170 stores information on the component parts (the housing 11, the installed objects 12 to 14, etc.) forming the product 3D model 10 provided from an output device 200.

The verified model manager 180 displays on the monitor 104a a screen (result display screen) reflecting the interference results stored in the interference result storage 160 on the product 3D model 10 stored in the model data storage 170.

Next, the geometric center route generator 120 will be described in detail.

Figure 6:
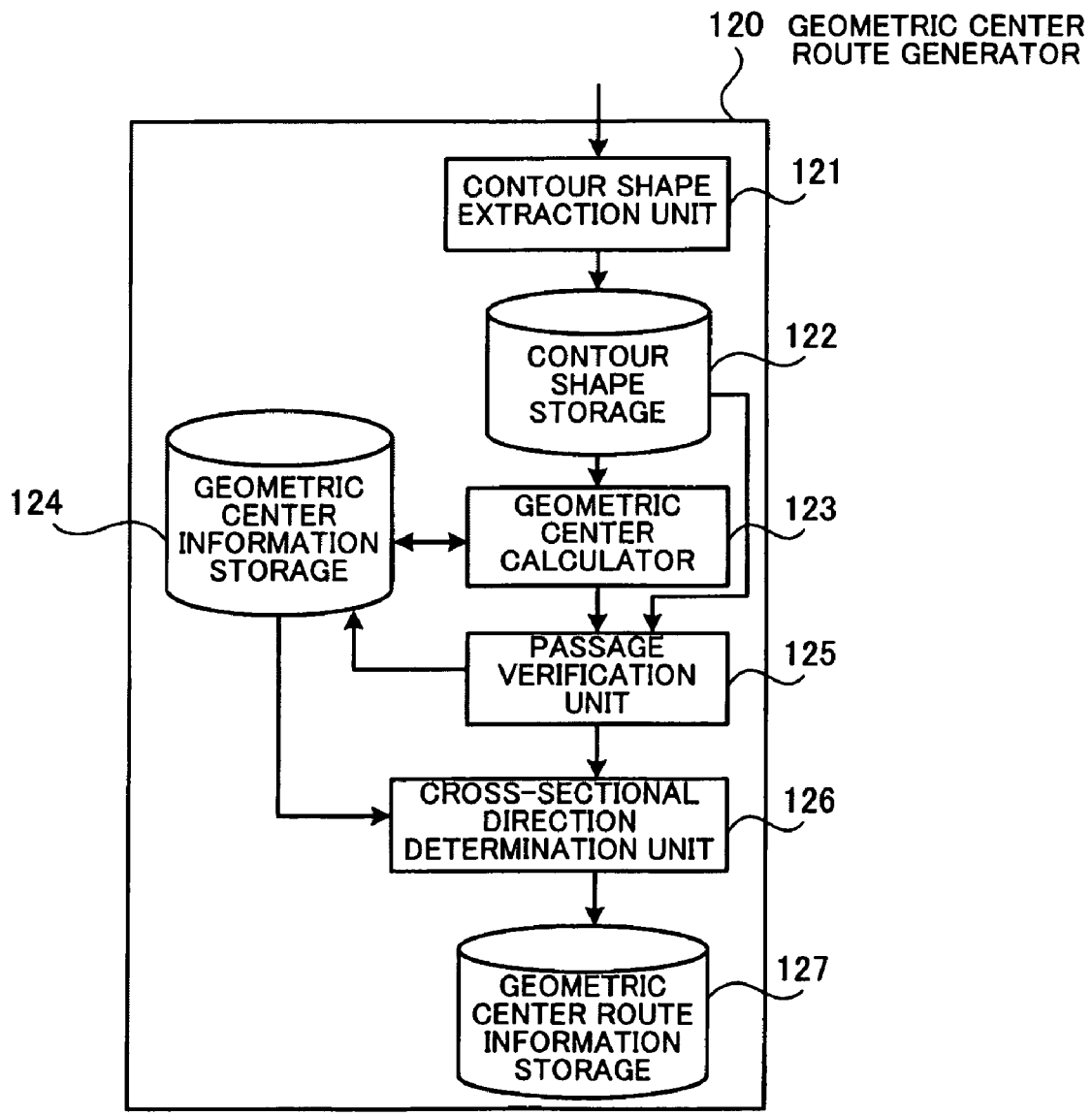
FIG. 6 is a block diagram of a geometric center route generator.

FIG. 6 is a block diagram of the geometric center route generator.

The geometric center route generator 120 comprises a contour shape extraction unit (shape extraction unit) 121, a contour shape storage 122, a geometric center calculator 123, a geometric center information storage 124, a passage verification unit 125, a cross-sectional direction determination unit (passing direction determination unit) 126, and a geometric center route information storage 127.

The contour shape extraction unit 121 extracts contour shapes assumed by the harness 20 during passage along the route, from shape information on the harness 20 which is managed by the route manager 110.

In the present embodiment, a contour shape defined by the minimum bend radius of the cable 21 and the dimensions of the connector 23 is extracted so as to perform processing for verifying whether or not the connector 23 can pass through a space defined by the installed objects 12 to 14.

The contour shape storage 122 stores information on the contour shapes extracted by the contour shape extraction unit 121.

The geometric center calculator 123 virtually extends radial straight lines from a way point on the route in the normal directions orthogonal to a tangential direction of the route and virtually positions points at respective locations where the straight lines come into contact with an installed object. When a straight line does not come into contact with any installed objects, a point is virtually positioned at a location where the straight line is extended from the center of the route by a predetermined distance.

The predetermined distance is not particularly limited, but it is determined based on the dimensions of the connector 23 and the minimum bend radius of the cable 21, for example.

A geometric center at the way point is calculated from the group of the points thus positioned.

Further, the geometric center calculator 123 stores in the geometric center information storage 124 the location of the calculated geometric center and the respective locations of the points positioned in calculating the geometric center, as geometric center information.

The passage verification unit 125 performs a check of interference of the connector 23 passing each way point with the installed objects 12 to 14 to thereby verify whether or not the connector 23 can pass the check point and the relay points while maintaining the contour shape extracted by the contour shape extraction unit 121.

Specifically, the center of a contour shape having a diagonal distance thereof minimized is aligned to a geometric center point at a way point on the route. Then, the contour shape is rotated, whereby interference of the contour shape against any of the installed objects 12 to is checked on a rotational angle-by-rotational angle basis. Thereafter, interference results are stored as interference point information in the geometric center information storage 124.

The cross-sectional direction determination unit 126 refers to the geometric center information storage 124 to determine a cross-sectional direction (attitude) of the connector 23 at each of the check points and the relay points.

Specifically, the cross-sectional direction determination unit 126 determines a cross-sectional direction of the connector 23 which minimizes the travel amount of the connector 23, based on directions and distances between points which are positioned in calculating respective geometric centers at a check point and a relay point adjacent to the check point or at two relay points adjacent to each other.

It should be noted that the cross-sectional direction of the connector 23 may be determined such that the amount of movement of the connector 23 from a shape assumed by the connector 23 during passage along the initial route is minimized.

Then, the cross-sectional direction determination unit 126 stores information on the determined attitude of the connector 23 in the geometric center route information storage 127.

Next, a description will be given of information stored in each unit.

First, information held by the route manager 110 will be described.

Figure 7:
FIG. 7 illustrates harness information.

FIG. 7 illustrates harness information.

In the route manager 110, the harness information is stored in a tabulated form.

A harness information management table 110*a* has respective fields for "cable diameter (mm)", "cable center minimum bend radius (mm)", "reference harness route information", "connector size #1 (mm)", and "connector size #2 (mm)".

A field for "cable diameter (mm)" stores the value of the diameter of the cable 21.

A field for "cable center minimum bend radius (mm)" stores the value of the minimum bend radius of the center of the cable 21.

A field for "reference harness route information" stores information for identifying a harness route information item to be referred to.

A field for "connector size #1 (mm)" stores the width, depth, and height of the connector 22 in the mentioned order.

A field for "connector size #2 (mm)" stores the width, depth, and height of the connector 23 in the mentioned order.

FIG. 8 illustrates harness route information.

In the route manager 110, the harness route information is stored in a tabulated form.

A harness route information management table 110*b* illustrated herein has a tag "Point001" added thereto which indicates that the harness route information management table 110*b* is associated with the harness information management table 110*a*.

The harness route information management table 110*b* has fields for "check point (relay point) number", "absolute coordinate position (X,Y,Z)", "passing direction RX (vector)", "passing direction RY (vector)", "passing direction RZ (vector)", and "connector attitude (RX,RY,RZ)".

Fields for "check point (relay point) number" have numbers set therein for identifying check points or relay points, respectively. In FIG. 8, "1", "2", "3", and "4" are numbers for identifying respective check points, and "1-1" and "1-2" are numbers for identifying respective relay points.

Fields for "absolute coordinate position (X,Y,Z)" store respective sets of absolute coordinates in the X-axis direction, the Y-axis direction, and the Z-axis direction of the check points and relay points, which are determined with reference to the origin which is set to a predetermined position of the connector 22.

Fields for "passing direction RX (vector)" store respective magnitudes of travel distances in the X-axis direction from respective immediately preceding check points.

Fields for "passing direction RY (vector)" store respective magnitudes of travel distances in the Y-axis direction from respective immediately preceding check points.

Fields for "passing direction RZ (vector)" store respective magnitudes of travel distances in the Z-axis direction from respective immediately preceding check points.

Fields for "connector attitude (RX,RY,RZ)" store respective sets of absolute coordinates representing attitudes of the connector 23. It should be noted that the fields for "connector attitude (RX,RY,RZ)" associated with the respective check points "2" to "4" are blank.

Next, a description will be given of contour shape information stored in the contour shape storage 122.

FIG. 9 illustrates the contour shape information.

The contour shape storage 122 stores the contour shape information on the harness 20 in a tabulated form. The contour shape information concerns shapes defined by the minimum bend radius of the cable 21 and the dimensions of the connector 23, as mentioned hereinbefore.

A contour shape management table 122*a* has fields for contour shapes (contour shape #1, contour shape #2, and contour shape #3) of a figure (rectangular parallelepiped) defined by the minimum bend radius of the cable 21 and the dimensions of the connector 23, as viewed from respective three-dimensional directions.

Fields in each horizontal row are provided for "X size", "Y size", "diagonal distance", and "center position", and these information items in the horizontal row are associated with each other.

Each field for "X size" stores a value (mm) of length of one of the width, depth, and height of the rectangular parallelepiped, when the one is set along the X axis.

Each field for "Y size" stores a value (mm) of length of one of the remaining two of the width, depth, and height of the rectangular parallelepiped, when the one of the remaining two is set along the Y axis.

For "contour shape #1", the field for "X size" stores a value of the width of the rectangular parallelepiped, and the field for "Y size" stores a value of depth of the rectangular parallelepiped.

For "contour shape #2", the field for "X size" stores a value of width of the rectangular parallelepiped, and the field for "Y size" stores a value of height of the rectangular parallelepiped.

For "contour shape #3", the field for "X size" stores a value of depth of the rectangular parallelepiped, and the field for "Y size" stores a value of height of the rectangular parallelepiped.

Each field for "diagonal distance" stores a diagonal distance in a rectangle formed on a two-dimensional plane by the values stored in the respective associated boxes of "X size" and "Y size".

Each field for "center position" stores the coordinates of a center position of a contour shape with reference to the origin which is set to a predetermined position of the rectangular parallelepiped.

Next, a description will be given of geometric center information stored in the geometric center information storage 124.

FIG. 10 illustrates the geometric center information.

The geometric center information storage 124 stores the geometric center information in a tabulated form.

A geometric center information management table 124a has fields for "check point (relay point) number", "relative position #1 (X1,Y1)" to "relative position #8 (X8,Y8)", "relative position (X,Y) to geometric center", and "contour shape attitude (RX,RY)".

Fields for "relative position #1 (X1,Y1)" to "relative position #8 (X8,Y8)" each store a set of coordinates indicative of a relative position of an associated one of points which are positioned when the geometric center calculator 123 calculates an associated one of geometric centers, with respect to the origin set to an associated check point or relay point.

For example, a field for "relative position #1 (X1,Y1)" at a check point number of "1" stores a set of coordinates (X coordinate and Y coordinate) indicative of a relative position of a point positioned when the associated geometric center is calculated for the check point having the check point number "1", with respect to the origin set to the position of the check point having the check point number "1".

This also applies to "relative position #2 (X2,Y2)" to "relative position #8 (X8,Y8)".

Fields for "relative position (X,Y) of geometric center" each store the coordinates (X and Y coordinates) of a relative position of each geometric center with respect to the origin which is set to the position of an associated one of check points and relay points.

Fields for the contour shape attitude (RX,RY) each store coordinates (X and Y coordinates) indicative of an attitude of a contour shape determined by an attitude determination process, described hereinafter.

Next, a description will be given of geometric center route information stored in the geometric center route information storage 127.

FIG. 11 illustrates interference point information.

The geometric center information storage 124 stores the interference point information in a tabulated form.

An interference point information management table 124b has fields for respective sets of coordinates indicative of relative positions (different from the relative positions in the geometric center information management table 124a) of the respective points positioned when the geometric center calculator 123 calculates respective geometric centers. Further, at the bottom of the interference point information management table 124b, there are provided fields for the total numbers of interference points.

Fields in a row for the coordinates indicative of the relative positions each store a result ("exists" or "not exists") of check of interference with the contour shape at each associated relative position when the center of the contour shape is positioned in the associated geometric center.

For example, a field for "relative position #11 (X11, Y11)" at a check point number of "1" stores a result ("not exists") of a check of interference of coordinates (X and Y coordinates) indicative of a relative position of a point positioned when the check of interference at the check point having the check point number "1" is performed, with respect to the origin set to the geometric center.

This also applies to each of "relative position #12 (X12, Y12)" to "relative position #18 (X18, Y18)".

Fields for "interference points (total)" in a row each store the total number of interferences for each of the check points and relay points.

FIG. 12 illustrates geometric center route information.

The geometric center route information storage 127 stores the geometric center route information in a tabulated form.

A geometric center route information management table 127a has fields for "absolute coordinate position (X,Y,Z)", "passing direction RX (vector)", "passing direction RY (vector)", "passing direction RZ (vector)", "connector attitude (RX,RY,RZ)", and "empty space".

Fields for "absolute coordinate position (X,Y,Z)" each store coordinates obtained by adding a coordinate position stored in an associated field for "relative position (X,Y) to geometric center" in the geometric center information management table 124a to a coordinate position stored in an associated field for "absolute coordinate position (X,Y,Z)" in the harness route information management table 110b.

For example, a field at a check point number of "1" stores coordinates (0, 0, 30.7) obtained by adding a coordinate position (0, 0, 27.2) stored in the associated field for "relative position (X,Y) to geometric center" in the geometric center information management table 124a to a coordinate position (0, 0, 3.5) stored in the associated field for "absolute coordinate position (X,Y,Z)" in the harness route information management table 110b.

Fields for "passing direction RX (vector)" each store the magnitude of a travel distance in the X-axis direction from the immediately preceding check point.

Fields for "passing direction RY (vector)" store the magnitude of a travel distance in the Y-axis direction from the immediately preceding check point.

Fields for "passing direction RZ (vector)" each store the magnitude of a travel distance in the Z-axis direction from the immediately preceding check point.

Fields for "connector attitude (RX,RY,RZ)" each store absolute coordinates representing an attitude of the connector 23.

Fields for "empty space" each store whether or not there is an empty space large enough for the harness 20 to pass, for each associated check point. Specifically, the result of a check of interference of the harness 20 with other structures, described hereinafter, is stored. When it is determined by an interference check that the harness 20 does not interfere with any other structure, "exists" is stored in the associated filed for "empty space". On the other hand, when the harness 20 interferes with another structure, "not exists" is stored in the associated field for "empty space".

Next, a description will be given of a method of geometric center calculation executed by the geometric center calculator 123.

First, the center of gravity of a triangle and the area of the same are calculated. Then, the geometric center of a polygon is determined using the result of the calculation.

<Calculation of Gravity Center of Triangle>

A triangle having three vertices, i.e. a point 1 (X1,Y1), a point 2 (X2,Y2), a point 3 (X3,Y3) will be taken as an example.

The gravity center (xg, yg) is expressed by the following equations (1) and (2) according to the formula of the gravity center of a triangle:

$$xg=(x1+x2+x3)/3 \tag{1}$$

$$yg=(y1+y2+y3)/3 \tag{2}$$

<Calculation of Area of Triangle>

The area of a triangle having an origin (0,0), the point 1 (X1,Y1), and the point 2 (X2,Y2) as the three vertices is calculated.

An area C of a parallelogram formed by a vector (X1,Y1) and a vector (X2,Y2) is expressed by the following equation (3):

$$C = x1 \cdot y2 - y1 \cdot x2 \tag{3}$$

The area S of the triangle is half the area C of the parallelogram. Therefore, the area S is expressed by the following equation (4):

$$S = C/2 \tag{4}$$

<Calculation of Geometric Center of Polygon>

Figure 13:
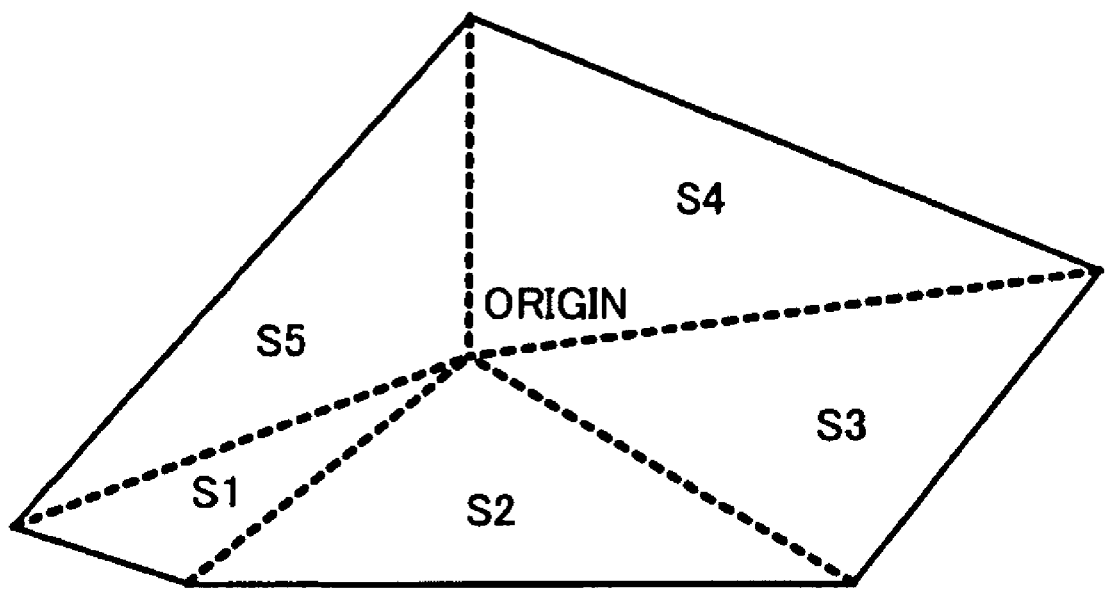
FIG. 13 is a view useful in explaining calculation of a geometric center of a polygon.

FIG. 13 is a view useful in explaining calculation of the geometric center of a polygon.

The geometric center (xg, yg) of a polygon is obtained by integrating the gravity center and area of each of triangles formed through division of the polygon as illustrated in FIG. 13, and then dividing the integrated value by a total area.

S1, S2, . . . , Sn: areas of respective triangles
St=S1+S2+ . . . +Sn: total area of triangles
(xg1, yg2): gravity center of triangle S1
(xg2, yg2): gravity center of triangle S2
. . .
(xgn, ygn): gravity center of triangle Sn Accordingly, the geometric center (xg, yg) is expressed by the following equations (5) and (6):

$$xg=(S1 \cdot xg1+S2 \cdot xg2+ \ldots +Sn \cdot xgn)/St \tag{5}$$

$$yg=(S1 \cdot yg1+S2 \cdot yg2+ \ldots +Sn \cdot ygn)/St \tag{6}$$

Next, a description will be given of the method of linear interpolation performed by the connector moving unit 150.

<Method of Linear Interpolation>

In the following, the method of linear interpolation will be described on a two-dimensional basis as an example.

Figure 14:
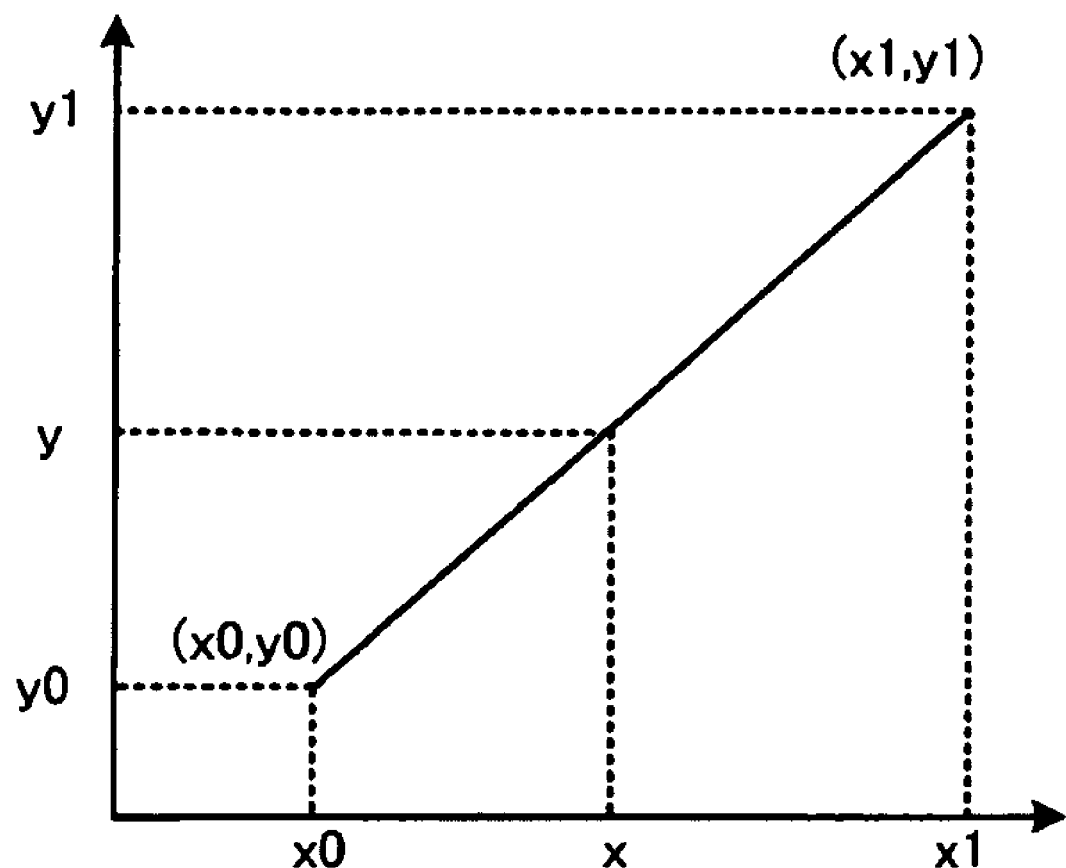
FIG. 14 is a view useful in explaining a method of linear interpolation.

FIG. 14 is a view useful in explaining the method of linear interpolation.

It is assumed that coordinates (x0, y0) and (X1,Y1) are given. When a certain x value is given between x0 and x1, it is desired to obtain an associated point on the line segment.

$$(y-y0)/(y1-y0)=(x-x0)/(x1-x0) \tag{7}$$

It is assumed that a value equal to both sides is represented by α (interpolation coefficient). The equation (7) expresses a ratio between a distance from x0 to x1 and a distance from x0 to a point corresponding to x. If a value to be substituted into x is given, α is determined by the following equation (8):

$$\alpha=(x-x0)/(x1-x0) \tag{8}$$

Further, α is also determined by the following equation (9):

$$\alpha=(y-y0)/(y1-y0) \tag{9}$$

By algebraically manipulating this equation, there is obtained the following equation (10):

$$y=(1-\alpha)y0+\alpha y1 \tag{10}$$

By calculating the value of α using the equation (8), it is possible to determine the value of y from the equation (10).

In the present embodiment, this method of linear interpolation is applied to each of a three-dimensional position (x,y, z) and a three-dimensional attitude (rx,ry,rz).

Next, a description will be given of a process executed by the design support apparatus 100.

Figure 15:
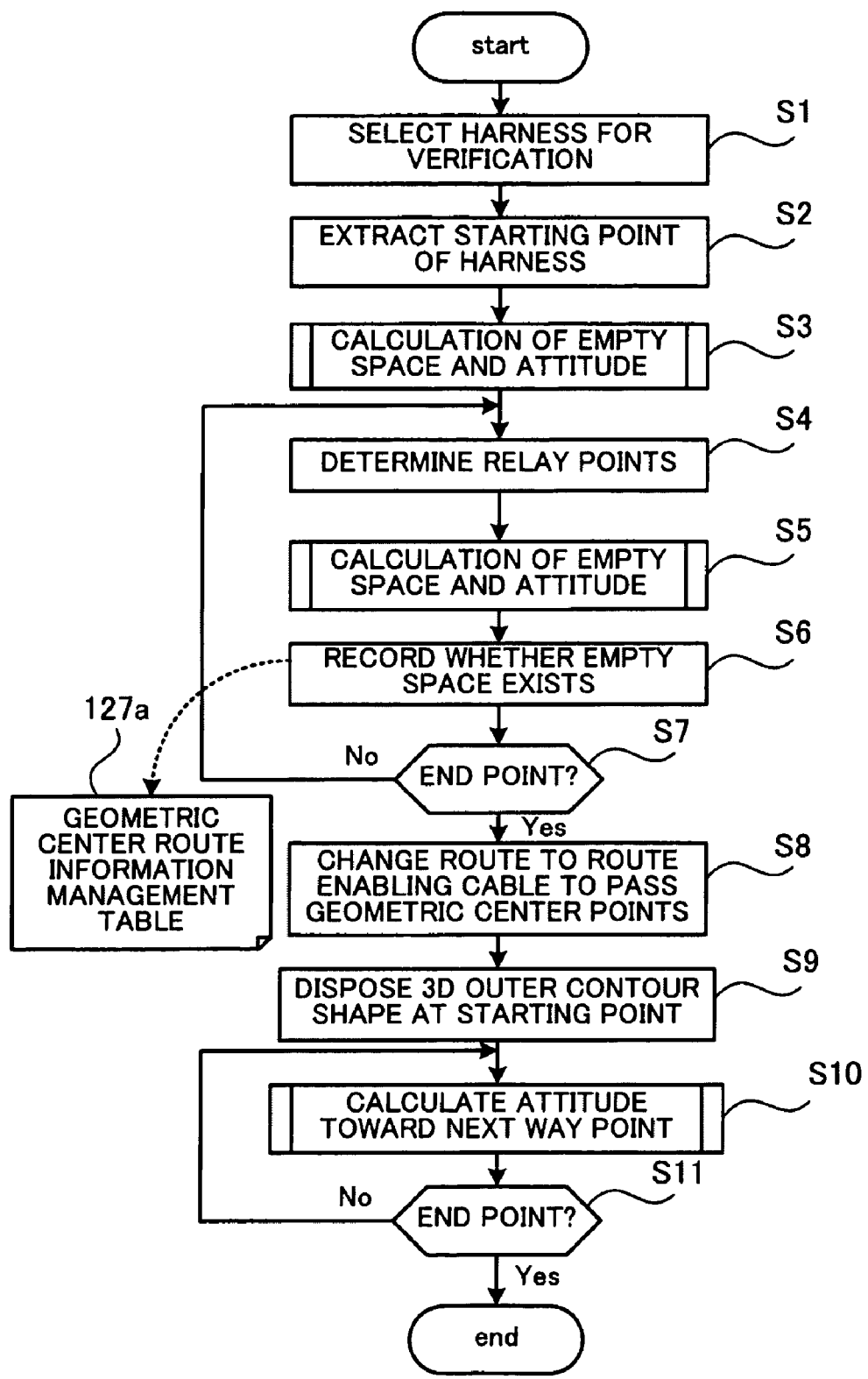
FIG. 15 is a flowchart of a process executed by the design support apparatus.

FIG. 15 is a flowchart of the process executed by the design support apparatus.

First, the route manager 110 selects the harness 20 for verification (step S1).

Then, the geometric center route generator 120 extracts a check point (starting point) of the harness 20 having a check point number of "1" (step S2).

Then, the geometric center route generator 120 calculates an empty space and an attitude of the connector 23 at the check point having the check point number "1" extracted in the step S2 (step S3). It should be noted that the method of the calculation will be described hereinafter.

Further, the geometric center route generator 120 determines a relay point next to the check point having the check point number "1" on the route (step S4).

Then, an empty space and an attitude of the connector 23 at the determined relay point on the route are calculated by the same method as employed in the step S3 (step S5).

Thereafter, the geometric center route generator 120 stores information on whether or not an empty space exists, in the geometric center route information management table 127a (step S6).

Then, it is determined whether or not the current relay point is an end point (i.e. whether or not there is a next way point on the route) (step S7).

If the current relay point is not an end point (NO to the step S7), the process returns to the step S4, and the processing of the steps S4 et sec. is performed on the next relay point on the route.

On the other hand, if the current relay point is an end point (YES to the step S7), the route changer 130 changes the current route to a route along which the cable 21 passes the geometric centers of the respective way points (step S8).

Next, the shaping unit 140 disposes a 3D outer contour shape at the check point having the check point number "1" (starting point) of the harness 20 (step S9).

Then, the connector moving unit 150 calculates an attitude of the connector 23 toward the next way point on the changed route (step S10). It should be noted that the method of this calculation will be described hereinafter.

Then, it is determined whether or not the current relay point is an end point (i.e. whether or not there is a next way point) (step S11).

If the current relay point is not an end point (NO to the step S11), the process returns to the step S10, and the processing of the steps S10 et sec. is performed on a next way point on the route.

On the other hand, if the current relay point is an end point (YES to the step S11), the present process is terminated.

Next, a detailed description will be given of a process (first attitude determination process) executed by the geometric center route generator 120 in the steps S3 and S5 for checking an empty space and determining an attitude of the connector 23.

Figure 16:
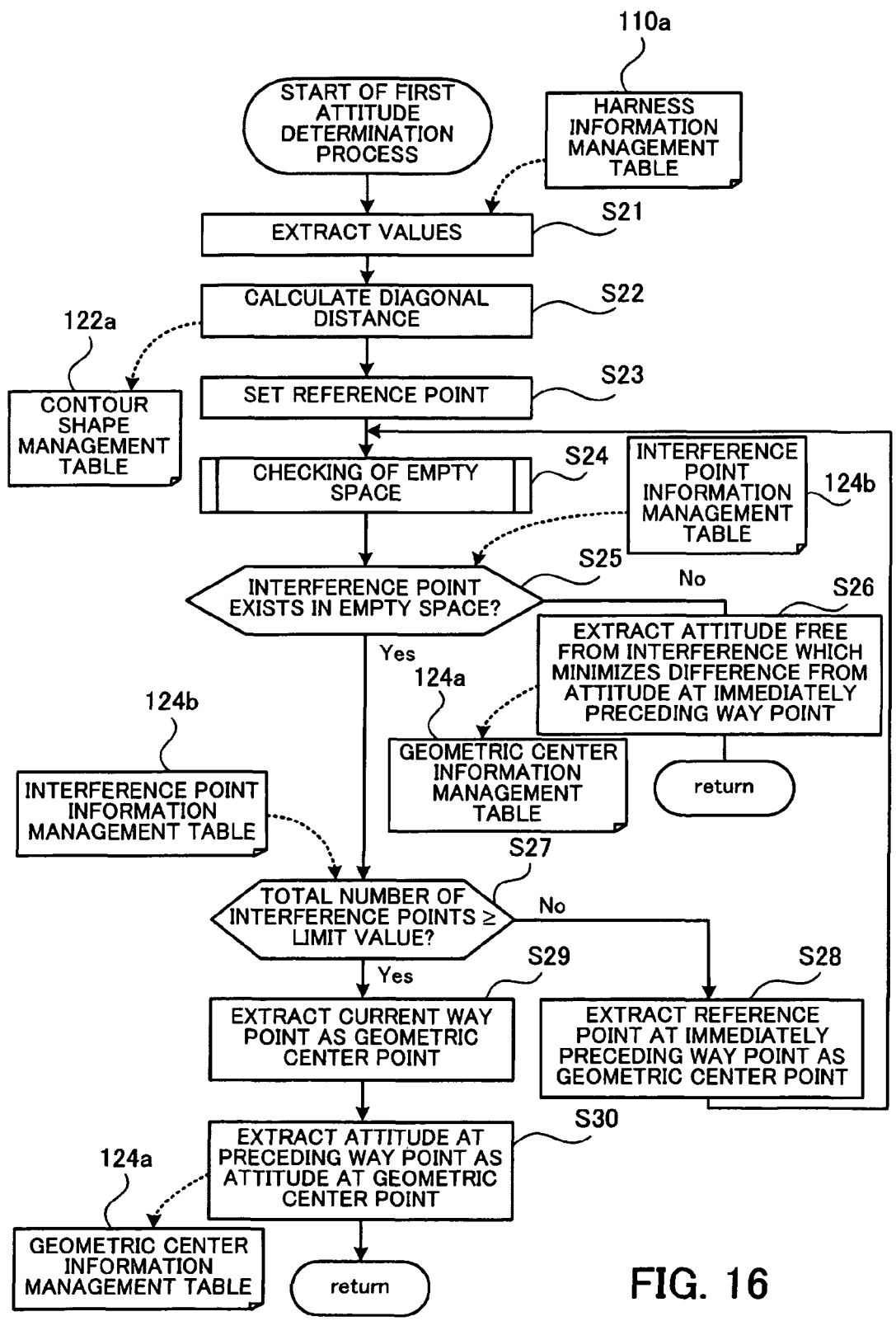
FIG. 16 is a flowchart of a first attitude determination process.

FIG. 16 is a flowchart of the first attitude determination process.

First, the contour shape extraction unit 121 extracts values from the respective fields for "cable diameter (mm), "cable center minimum bend radium (mm)", and "connector size #2 (mm)" in the harness information management table 110a (step S21).

Then, the contour shape extraction unit 121 calculates diagonal distances based on the extracted values (step S22) and stores the calculated diagonal distances in the contour shape management table 122a. It should be noted that a contour shape associated with the calculated diagonal distances is also stored in the contour shape management table 122a.

Next, the position of the way point is set to a reference point (calculation starting point) (step S23).

Then, the geometric center calculator 123 and the passage verification unit 125 check whether or not there is an empty space at the current way point (step S24). A method of this check will be described hereinafter.

After completion of the check on whether or not an empty space exists, the cross-sectional direction determination unit 126 refers to the interference point information management table 124b and determines whether or not there is any point of interference between a contour shape (contour shape determined in a step S37 referred to hereinafter) disposed in the empty space and any of the installed objects 12 to 14 (step S25).

If there is no point of interference between the contour shape and the installed objects 12 to 14 (NO to the step S25), the cross-sectional direction determination unit 126 determines an attitude of the connector 23 which minimizes the difference in attitude from the connector 23 at the immediately preceding way point (travel distance between connector center positions), when the contour shape (contour shape determined in the step S37 referred to hereinafter) is disposed at the current way point at a location where the contour shape does not interfere with any of the installed objects 12 to 14 (step S26). The determined information is stored in an associated field for "contour shape attitude (RX,RY)" of the geometric center information management table 124a.

Thereafter, the present process returns to the process in FIG. 15, and the following step (step S4 or S6) is executed.

On the other hand, if there is a point of interference between the contour shape and any of the installed objects 12 to 14, i.e. if the connector 23 necessarily interferes with some of the installed objects 12 to 14 when it is caused to pass the current way point (YES to the step S25), the cross-sectional direction determination unit 126 refers to the interference point information management table 124b and determines whether the total number of points of interference is not smaller than a predetermined limit value (step S27).

If the total number of interference points is smaller than the limit value (NO to the step S27), the cross-sectional direction determination unit 126 extracts a reference point set at the immediately preceding way point, as a geometric center point at the current way point (step S28). Thereafter, the process returns to the step S24, and the steps S24 et sec. are continuously executed.

On the other hand, if the total number of interference points is not smaller than the limit value (YES to the step S27), the cross-sectional direction determination unit 126 extracts a reference point for the current way point (reference point generated in advance for the way point based on the initial route) as a geometric center point at the current way point (step S29).

Then, the cross-sectional direction determination unit 126 determines an attitude of the connector 23 at the immediately preceding way point, as an attitude of the connector 23 at the current way point (step S30). The determined information is stored in the associated field for "contour shape attitude (RX, RY)" of the geometric center information management table 124a.

Thereafter, the present process returns to the process in FIG. 15, and the following step (step S4 or S6) is executed.

The first attitude determination process is executed as described above.

Next, the process (empty space check process) executed in the step S24 will be described in detail.

Figure 17:
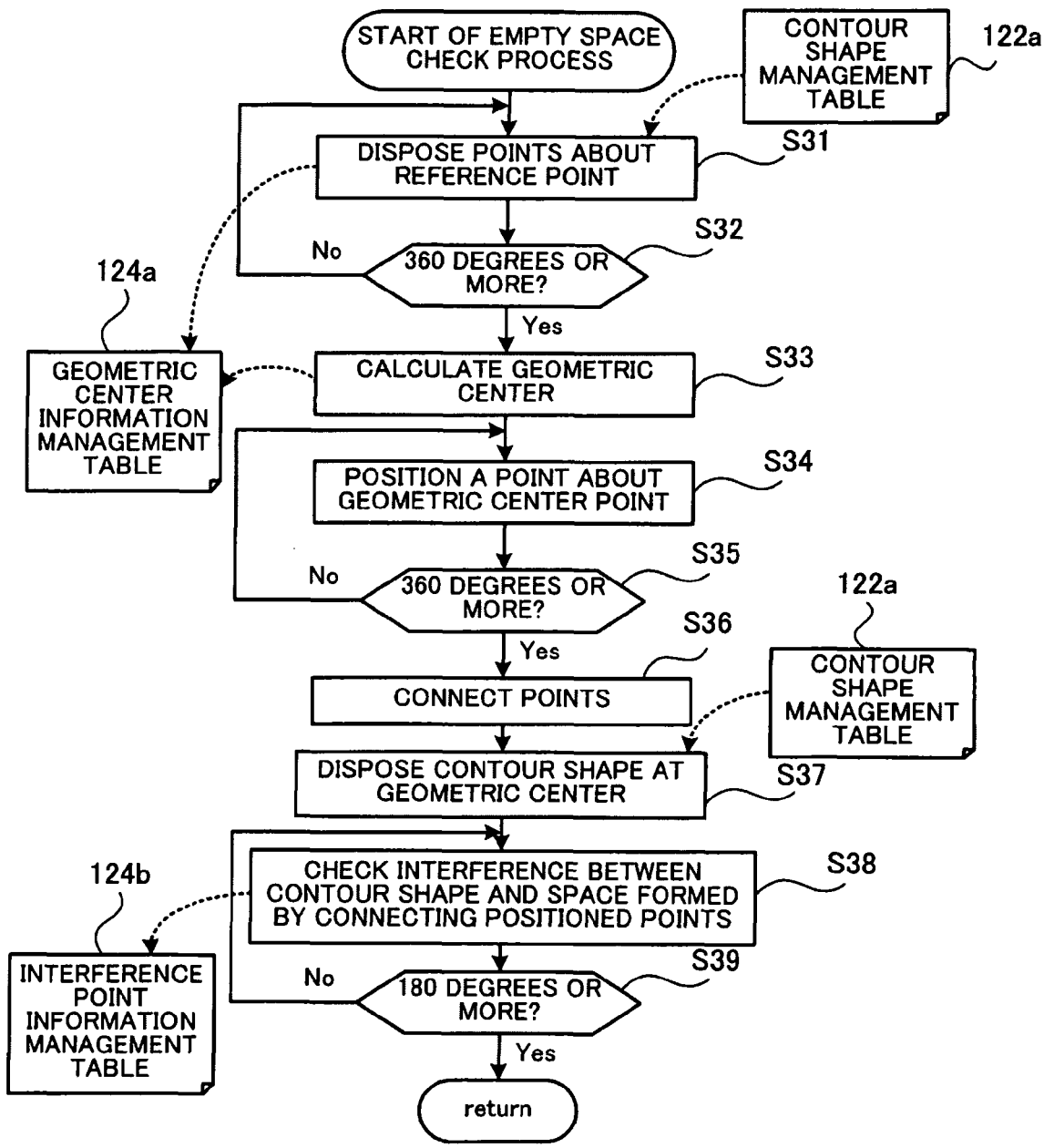
FIG. 17 is a flowchart of an empty space check process.

FIG. 17 is a flowchart of the empty space check process.

First, the geometric center calculator 123 refers to the contour shape management table 122a and extracts a minimum one of the diagonal distances determined in the step S22. This is because a contour shape with the minimum diagonal distance can be determined as a contour shape that requires a minimum passage area (cross-sectional area) for the harness 20 and is therefore most likely to enable the connector 23 to pass.

Then, the geometric center calculator 123 positions a point around the reference point as the center (step S31). Specifically, the geometric center calculator 123 extends a line segment (corresponding to the predetermined distance) from the reference point by a distance corresponding to the extracted diagonal distance in the normal direction orthogonal to a tangential direction of the route, and positions a point at a location where the line comes into contact with any of the installed objects. If the line segment does not come into contact with any installed object, a point is positioned at the front end of the line segment. Then, the coordinates of the relative position of the positioned point are stored in the geometric center information management table 12a.

Then, the geometric center calculator 123 determines whether or not the processing of the step S31 for positioning a point has been performed in a clockwise direction through an angle of 360 degrees (i.e. one round) or more (step S32).

If the angle through which the processing of the step S31 has been performed is less than 360 degrees (NO to the step S32), the process returns to the step S31, wherein another point is positioned. It should be noted that the number of points to be positioned is not particularly limited, but it can be freely determined e.g. by the designer. Assuming that it is determined in advance to position points at angular intervals of one degree, 360 points are positioned.

On the other hand, if the angle through which the processing of the step S31 has been performed is 360 degrees or more (YES to the step S32), the geometric center calculator 123 calculates the geometric center of the positioned points (step S33) to thereby determine a geometric center point (center position) where the cable 21 will pass. The relative coordinates of the determined geometric center point is stored in an associated one of the fields for "relative position (X,Y) to the geometric center" in the geometric center information management table 124a.

Next, the geometric center calculator 123 extends a line segment from the geometric center point determined in the step S33 by the distance corresponding to the diagonal distance, and positions a point at a location where the line comes into contact with any of the installed objects. If the line segment does not come into contact with any installed object, a point is positioned at the front end of the line segment (step S34). Then, the coordinates of the relative position of the positioned point are stored in the interference point information management table 124b.

Next, the geometric center calculator 123 determines whether or not the processing of the step S34 for positioning a point has been performed through an angle of 360 degrees (i.e. one turn) or more (step S35).

If the angle through which the processing of the step S31 has been performed is less than 360 degrees (NO to the step S35), the process returns to the step S34, wherein another contact point is extracted.

On the other hand, if the angle through which the processing of the step S31 has been performed is 360 degrees or more (YES to the step S35), the passage verification unit 125 connects the points arranged in the step S34. Specifically, the points are connected by lines in the order of the extraction in the step S34 (step S36).

Next, the passage verification unit 125 disposes a contour shape about the geometric center as the center (step S37). Specifically, the passage verification unit 125 refers to the contour shape management table 122a and causes the center of the contour shape which is minimum in the diagonal distance to coincide with the geometric center.

Then, the passage verification unit 125 checks interference between the contour shape and a space formed by connecting the points in the step S36 (step S38). If there is an interference point, an associated field in the interference point information management table 124b is set to "exists", and the value in the field for "interference points (total)" is incremented.

Next, it is determined whether or not the processing of the step S38 for checking interference has been performed through an angle of 180 degrees (half turn) or more (step S39). This is because the contour shape of the connector 23 is a figure which is point-symmetrical with respect to the center position of the cable 21, and therefore it is not necessary to perform the processing through an angle of 360 degrees.

If the angle through which the processing of the step S38 for checking interference has been performed is less than 180 degrees (NO to the step S39), the process returns to the step S38, wherein another contact point is checked for.

On the other hand, if the angle through which the processing of the step S38 for checking interference has been performed is 180 degrees or more (YES to the step S39), the present process is terminated.

The empty space check process is executed as described above.

Next, a detailed description will be given of the process (second attitude determination process) executed by the connector moving unit 150 in the step S10 in FIG. 15 for calculating an attitude of the connector 23 toward a next way point on the changed route.

Figure 18:
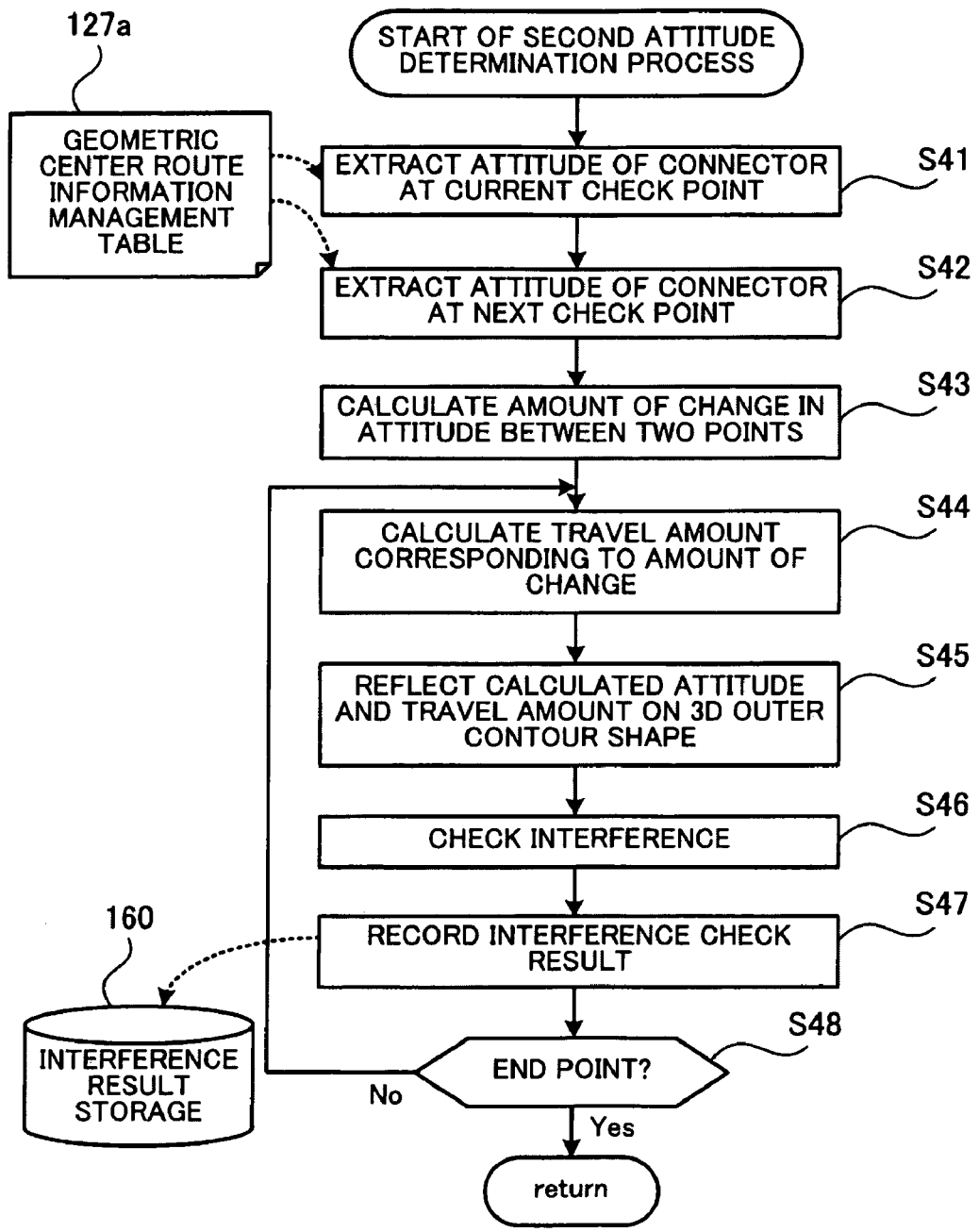
FIG. 18 is a flowchart of a second attitude determination process.

FIG. 18 is a flowchart of the second attitude determination process.

First, the connector moving unit 150 refers to the geometric center route information management table 127a and extracts an attitude of the connector 23 at the check point for calculation (step S41).

Next, the connector moving unit 150 refers to the geometric center route information management table 127a and extracts an attitude of the connector 23 at a check point next to the check point for calculation (step S42).

Then, the amount of change in attitude between the two points is calculated by the above-described linear interpolation (step S43).

Further, the travel amount corresponding to the amount of change calculated in the step S43 is calculated (step S44).

Then, the calculated attitude and travel amount are reflected on the 3D outer contour shape (step S45).

Then, interference between the 3D outer contour shape reflecting the calculated attitude and travel amount and any of the installed objects 12 to 14 at each way point is checked (step S46), and the result of the interference check is recorded in the interference result storage 160 (step S47).

Then, it is determined whether or not the check point is an end point (i.e. whether or not a next check point exists) (step S48).

If the check point is not an end point (NO to the step S48), the process returns to the step S44, and the processing of the steps S44 et seq. is executed in association with the next check point.

On the other hand, if the check point is an end point (YES to the step S48), the present process is terminated.

EXAMPLE

Next, the above-described processes will be described in more detail using the harness 20.

Figure 19:
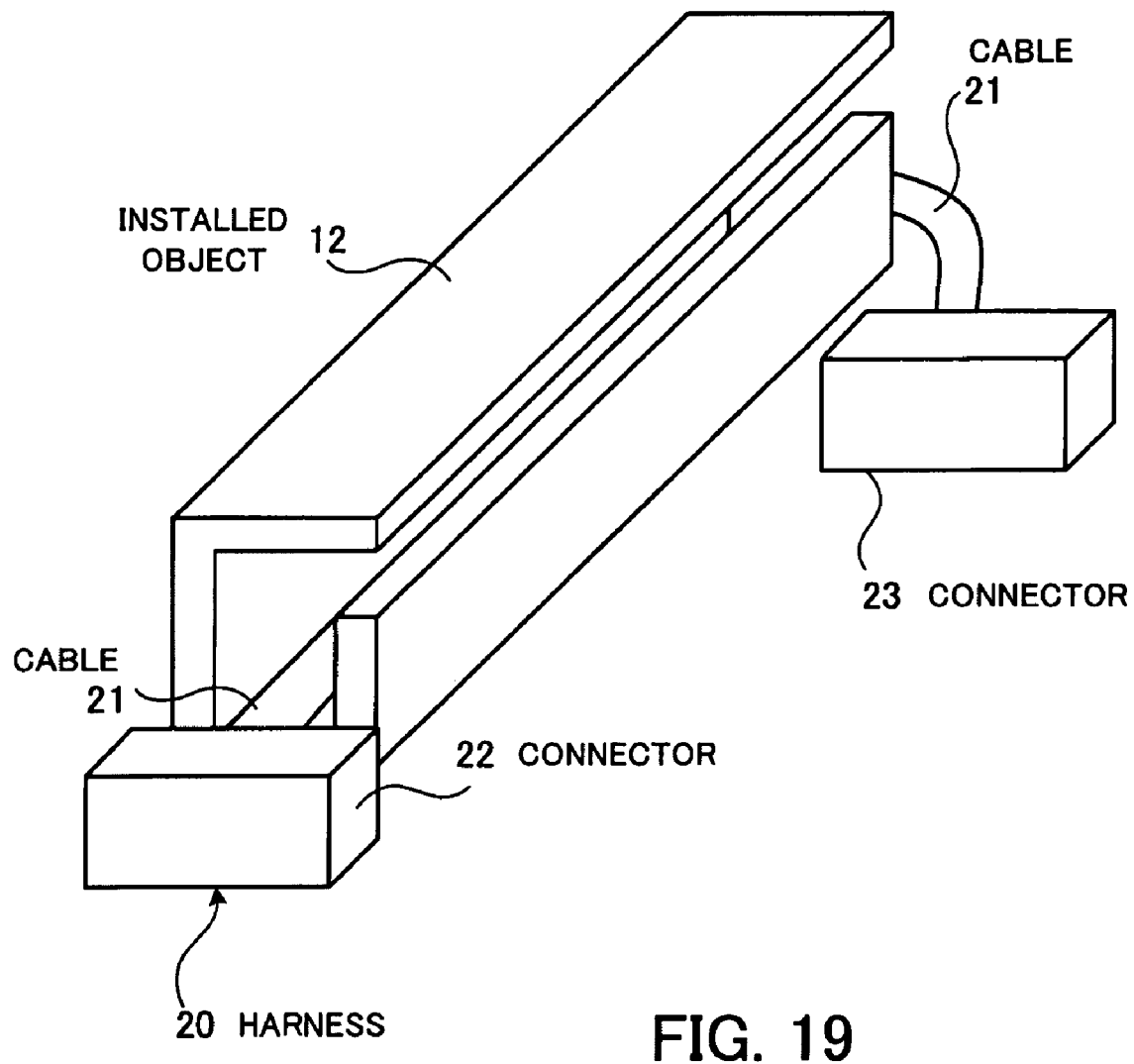
FIG. 19 illustrates the relationship between a harness and an installed object in an example.

FIG. 19 illustrates the relationship between the harness and an installed object in the present example. It should be noted that in FIG. 19, only the harness 20 and the installed object 12 are illustrated, and representation of the other structures is omitted.

In the present example, it is verified whether or not the connector 23 of the harness 20 can pass through the installed object 12.

Figure 20:
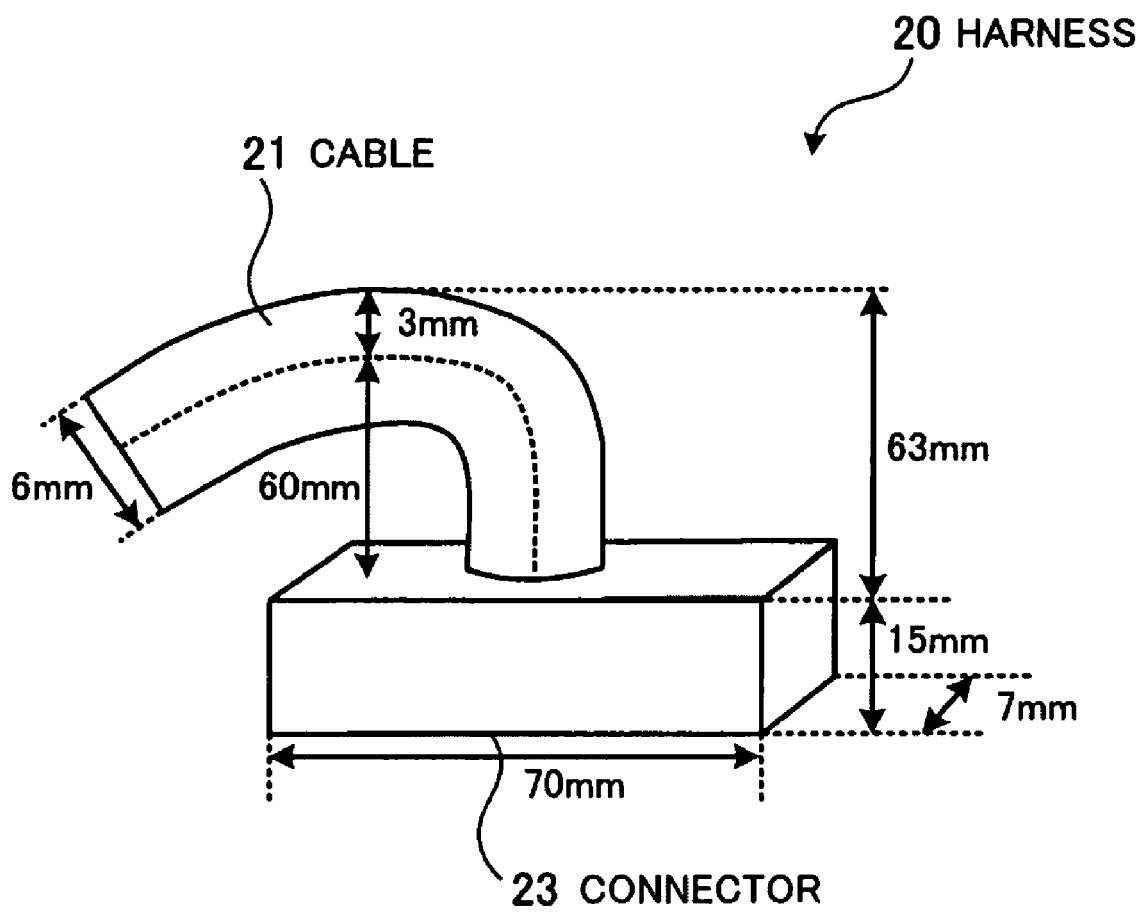
FIG. 20 illustrates dimensions of the installed object in the example.

FIG. 20 illustrates the dimensions of the harness in the present example.

The dimensions of the harness 20 are as follows:

dimensions of the connector: width: 70 mm; depth: 7 mm; height: 15 mm minimum bend radius of cable center: 60 mm cable radius: 3 mm Relay points in the present example are set at a pitch of the diameter of the cable 21, i.e. at intervals of 6 mm.

First, a contour shape required for passage through the installed object 12 is calculated from the dimensions of the connector 23 and the minimum bend radius of the cable 21, and then diagonal distances A of the contour shape are calculated.

As illustrated in FIG. 20, in the case of the harness 20, the minimum bend radius of the harness 20 is calculated to be equal to 60 mm+3 mm=63 mm.

The diagonal distance A of the contour shape #1 defined by the width (70 mm) and depth (7 mm) of the harness 20 is calculated to be equal to 70.3 mm.

The diagonal distance A of the contour shape #2 defined by the width (70 mm) and height (15 mm+63 mm) of the harness 20 is calculated to be equal to 104.8 mm.

The diagonal distance A of the contour shape #3 defined by the depth (7 mm) and height (15 mm+63 mm) of the harness 20 is calculated to be equal to 78.3 mm.

A diagonal distance A obtained as the minimum one is employed as the predetermined distance. In the present example, therefore, 70.3 mm is employed.

Next, the distance of empty space from the center of the cable 21 within the predetermined distance is measured.

First, at each of the way points on the harness 20, line segments are radially extended in directions normal to a tangential direction of the cable 21 to thereby check empty space.

Figure 21:
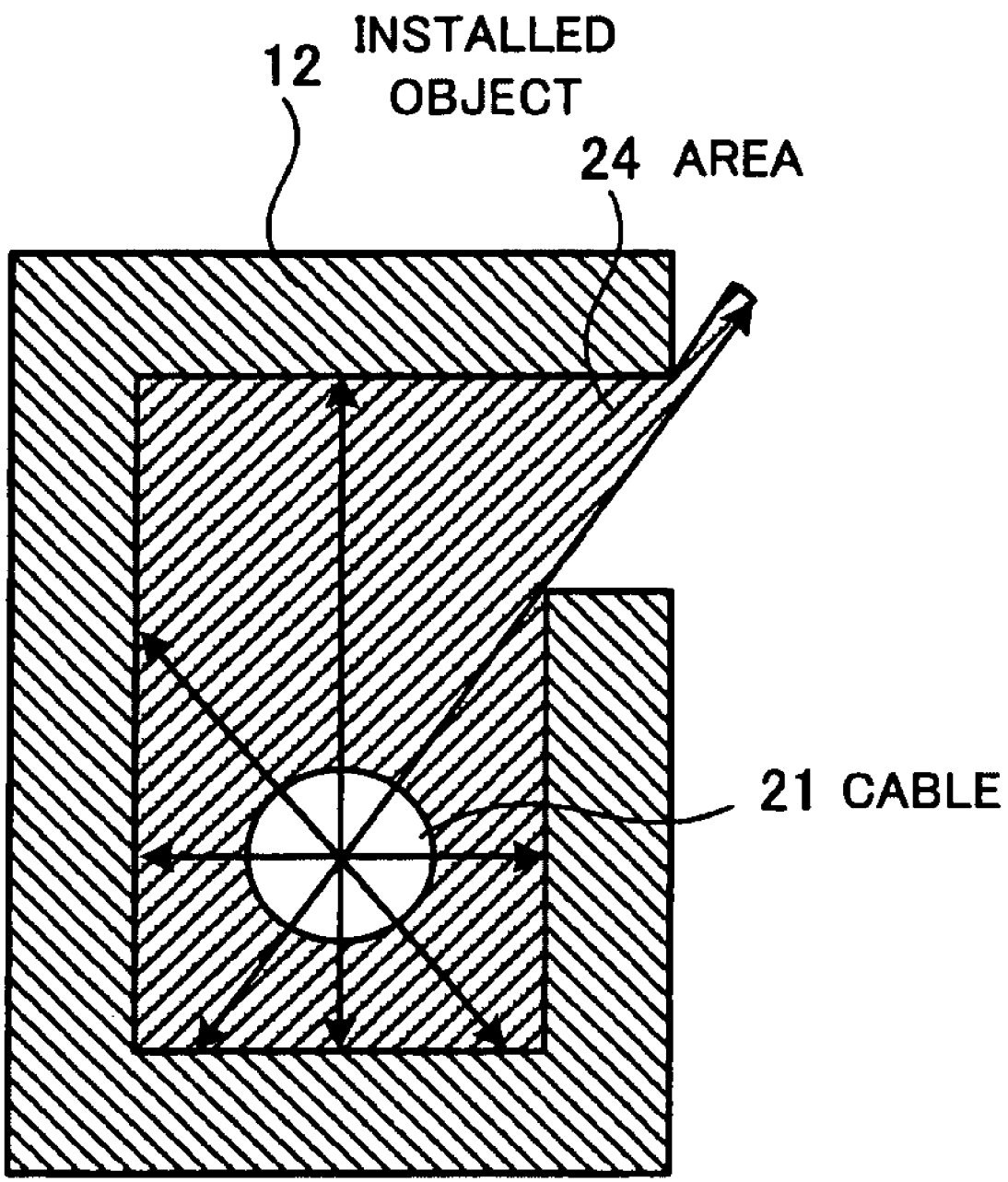
FIG. 21 is a cross-sectional view useful in explaining a check on the empty space in the installed object in the example.

FIG. 21 is a cross-sectional view useful in explaining a check on an empty space within an installed object in the present example.

When a line segment comes into contact with the installed object 12, a point is created where the contact occurs, and when a line segment does not come into contact with the installed object 12, a point is created at the predetermined distance from the associated way point. The processing for creating a point is repeatedly carried out in radial directions from the center of the cable 21.

The length of the line segment (predetermined distance) extended to find an empty space is set to the minimum diagonal distance A of 70.3 mm, as mentioned hereinbefore.

Then, an area of empty space is determined by sequentially connecting the created points. In FIG. 21, an area 24 is determined as an empty space area.

Figure 22:
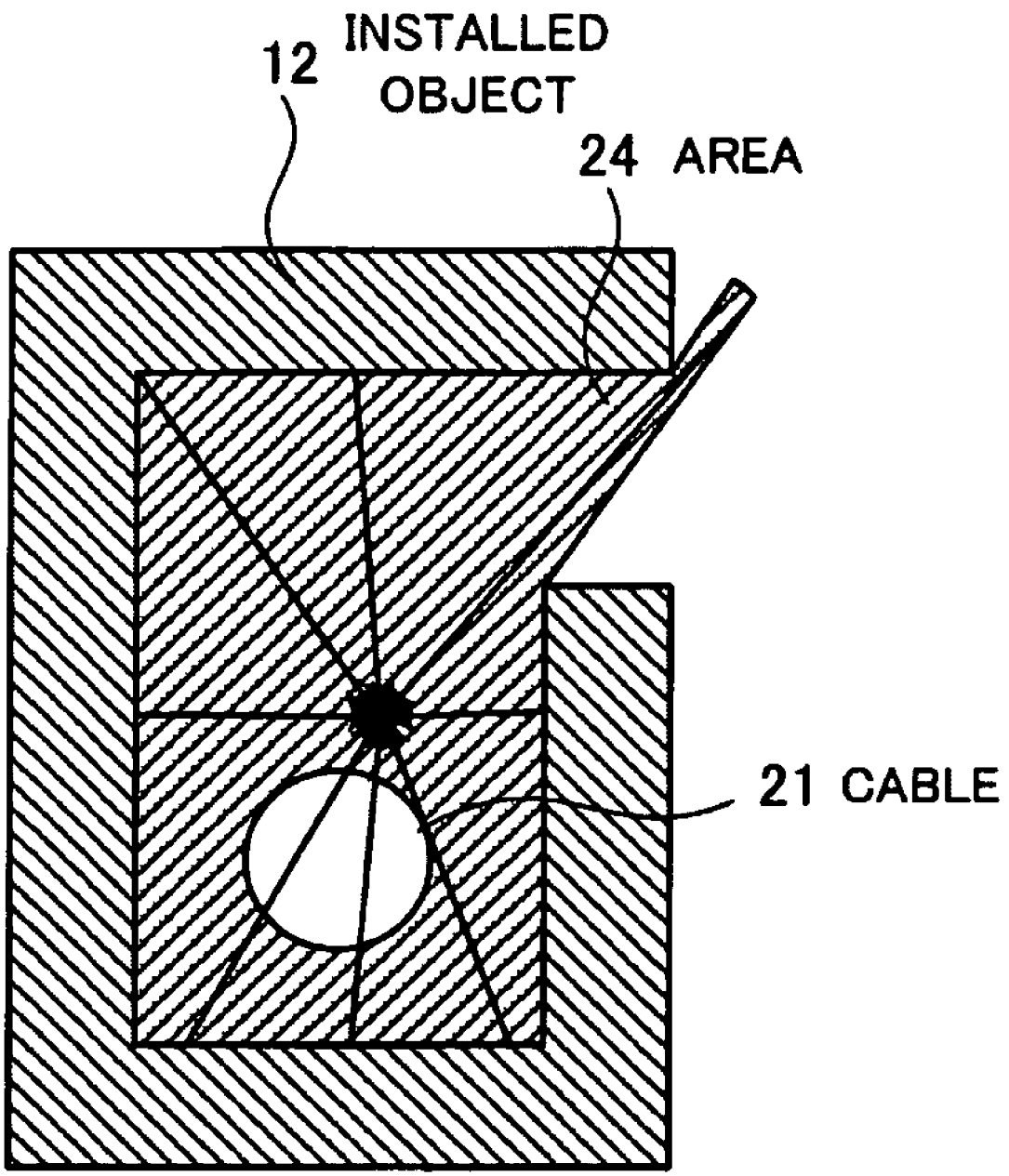
FIG. 22 is a view useful in explaining geometric center determination processing in the example.

FIG. 22 is a view useful in explaining geometric center determination processing in the present example.

Next, the geometric center calculator 123 calculates the geometric center of the extracted area 24 from the outer periphery of the area to determine a center position of the cable 21 (center position for passing the connector 23).

Then, a shift of the center position changes the empty space (space capable of passing the harness 20), and hence an empty space area is determined again based on a locus of points spaced from the newly calculated geometric center point by the predetermined distance.

Figure 23A:
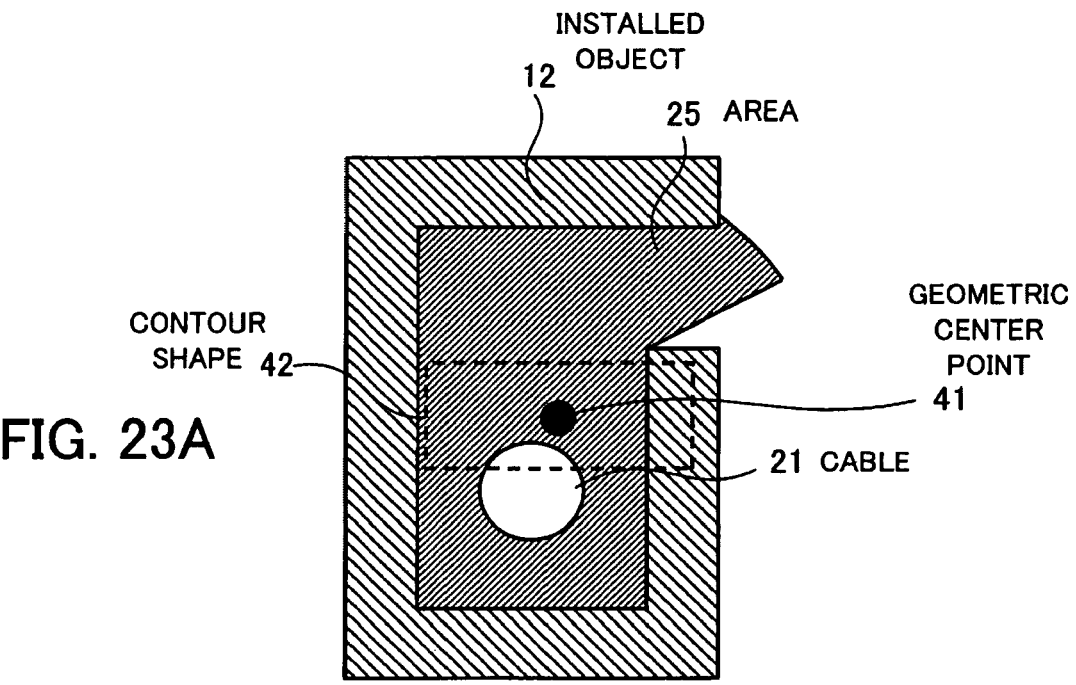
FIGS. 23A and 23B are views useful in explaining an interference check in the example.
Figure 23B:
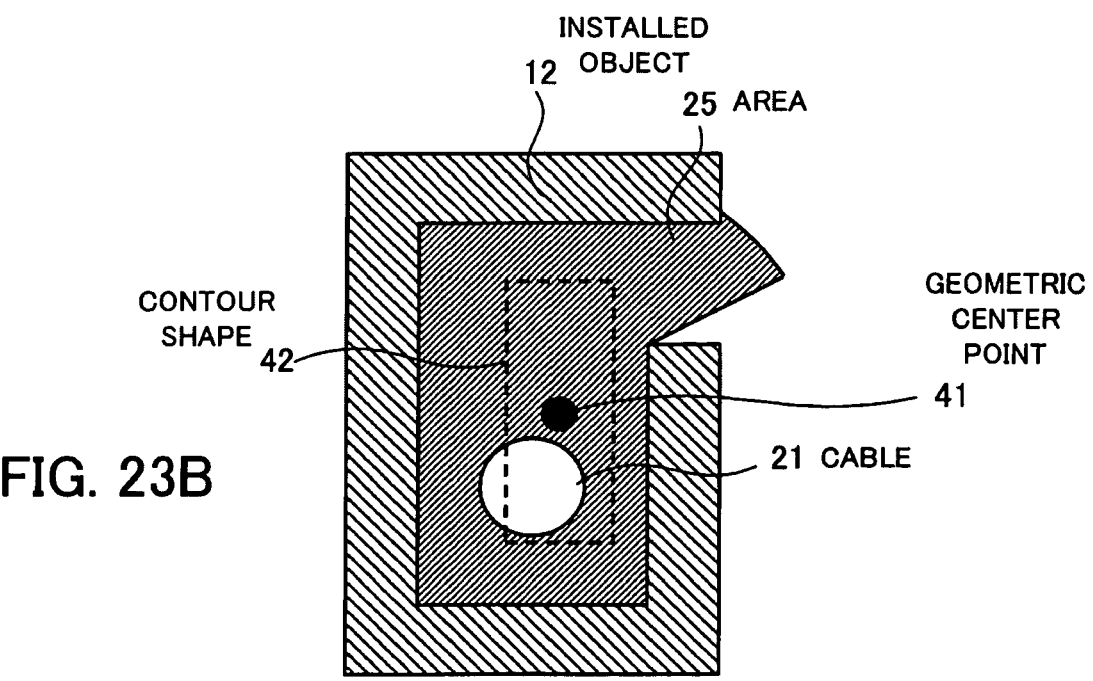

FIGS. 23A and 23B are views useful in explaining an interference check in the example.

FIGS. 23A and 23B illustrate an area 25 indicative of the empty space area extracted again.

As illustrated in FIG. 23A, the passage verification unit 125 rotates a contour shape 42 of the connector 23 obtained with a geometric center point 41 set as a center position, through 180 degrees while performing a check on interference between an outer shape line of the area 25 and the contour shape 42.

By doing this, a shape is determined which enables the connector 23 to pass, as illustrated in FIG. 23B, judging from an attitude judged as free from interference based on the result of the rotation and the original attitude of the connector, or an attitude extracted at the preceding way point.

A geometric center point is thus calculated in association with each of check points and relay points on the route, whereby a cross-sectional shape of the connector 23 for passing the same is determined.

Figure 24:
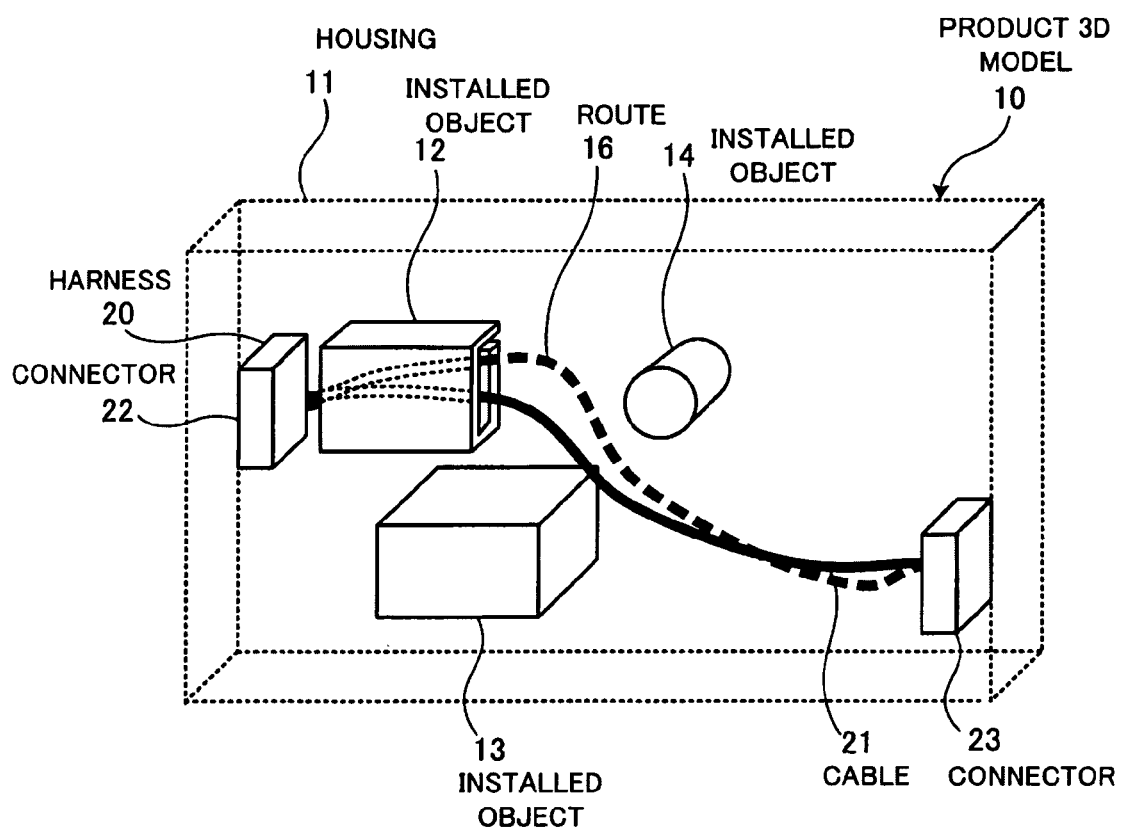
FIG. 24 illustrates a route formed by connecting geometric center points in the example.

FIG. 24 illustrates a route formed by connecting the geometric center points in the present example.

The route changer 130 changes the initial route to a route 16 formed by connecting the geometric center points, as described hereinbefore.

Then, the shaping unit 140 disposes the 3D outer contour shape.

Figure 25:
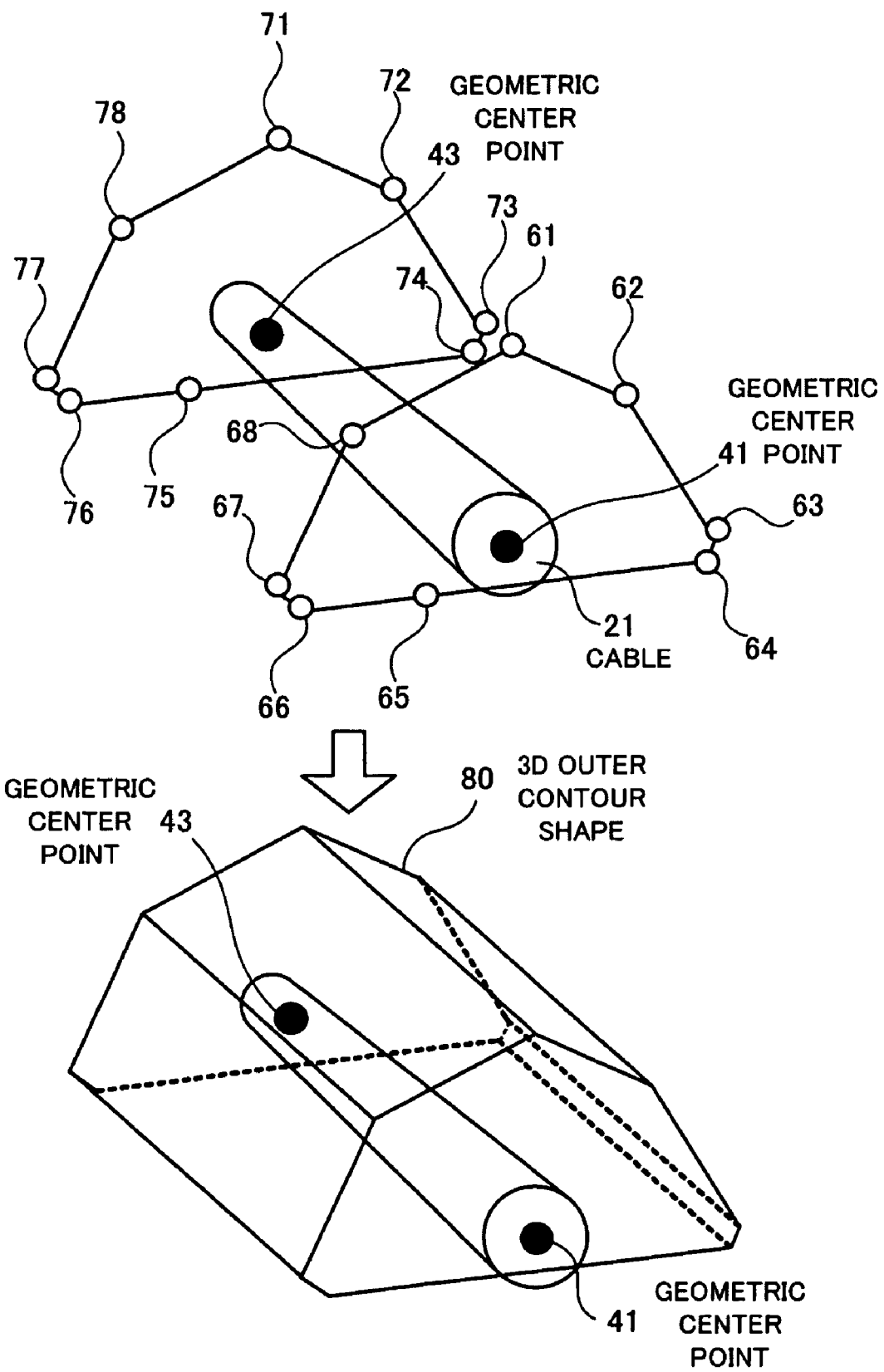
FIG. 25 illustrates an outer 3D contour shape in the example.

FIG. 25 illustrates the 3D outer contour shape in the present example.

Figures each formed by a locus of points formed by connecting the relative coordinates in the fields of the relative positions #11 to #18 in the interference point information management table 124b in a clockwise direction as viewed in the advancing direction of the cable 21 are created about respective geometric center points on the changed route 16.

In FIG. 25, there are illustrated, by way of example, points 61 to 68 represented by relative coordinates in the respective fields of the relative positions #11 to #18 associated with the geometric center point 41 as a way point, and points 71 to 78 represented by relative coordinates in the respective fields of the relative positions #11 to #18 associated with a geometric center point 43 as a way point adjacent to the geometric center point 41.

A 3D outer contour shape 80 can be determined by connecting the points represented by the relative coordinates along the route into a shape.

Then, the interference check is performed while moving the 3D outer contour shape 80 along the route 16.

Thereafter, the verified model manager 180 causes a result display screen illustrating the results of the interference check to be displayed on the monitor 104a.

Figure 26:
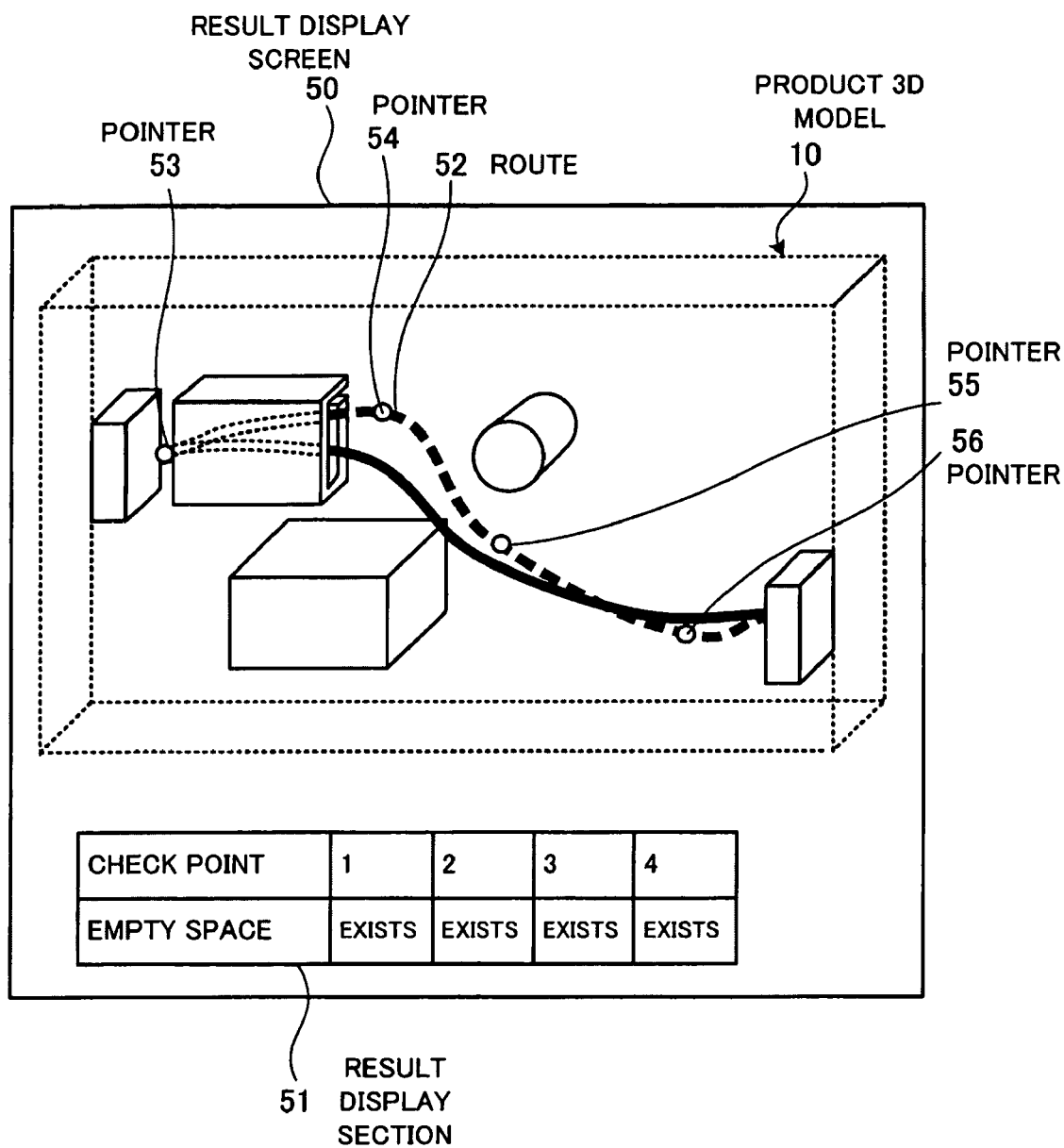
FIG. 26 illustrates a result display screen in the example.

FIG. 26 illustrates the result display screen in the present example.

On the result display screen 50, there are displayed the product 3D model 10 and a result display section 51 showing results of check on interference between the harness 20 and the installed objects 12 to 14 in the product 3D model 10.

As illustrated in FIG. 26, in the product 3D model 10, there are displayed pointers 53, 54, 55, and 56 representing respective portions of a route 52 (corresponding to the route 16) changed by the route changer 130. The portions correspond to the respective check points in the geometric center route information management table 127a.

In the result display section 51, a check point having the check point number "1" corresponds to the pointer 53, a check point having the check point number "2" corresponds to the pointer 54, a check point having the check point number "3" corresponds to the pointer 55, and a check point having the check point number "4" corresponds to the pointer 56.

This makes it possible to easily find a check point where no empty space exists (i.e. where an interference with any of the installed objects 12 to 14 has occurred).

Although in FIG. 26, only the check points and existence/non-existence of an empty space associated with each of the check points are displayed in the result display section 51, this is not limitative, but relay points and existence/non-existence of an empty space associated with each of the relay points may also be displayed. This makes it possible to obtain further detailed interference point information.

As described above, according to the design support apparatus 100, an empty space necessary for passage of the harness 20 is calculated based on a prepared initial route for the harness 20, and a route having geometric center points as its center position is created anew to change the route. This makes it possible to easily change the initial route for the harness 20 to a route highly likely to enable passage of the harness 20.

Further, empty space is checked along the changed route to thereby check whether or not empty space for the changed route exists. This makes it possible to facilitate verification of a route and reduce time necessary for the route verification.

Further, by providing the cross-sectional direction determination unit 126, so that not only is determined a route, but also a cross-sectional direction of the connector 23 which is set to an attitude enabling to connector 23 to pass through the installed objects 12 to 14 is determined according to space in the cross-sectional direction. This makes it possible to achieve correction of the cross-sectional direction (dependent on the attitude) at each of the check points and the relay points and reduction of verification time.

Furthermore, the contour shape extraction unit 121 calculates contour shapes for respective categories (contour shapes #1 to #3) based on shape information on the connectors 22 and 23 of the harness 20, and the diameter, minimum bend radius, and so forth of the cable 21. This eliminates the necessity of manually creating a contour shape enabling passage of the harness 20, which contributes to reduction of verification time.

What is more, the connector moving unit 150 moves the connector 23 along a route formed anew by the route changer 130, whereby the position, contour shape, and direction of the connector 23 at each of the check points and relay points through which the connector 23 passes are recorded, and linear interpolation is performed between the way points. This makes it possible to perform verification not only at the check points but also on the entire route, which contributes to improvement in the accuracy of verification.

Further, since the shaping unit 140 shapes an empty space based on the harness 20, the designer can visually grasp the space. This makes it possible to reduce check time.

<Variation>

Although in the present embodiment, when it is determined in the step S27 of the attitude determination process in FIG. 16 that the total number of interference points is not smaller than the limit value, the step S29 is immediately executed, this is not limitative, but a contour shape may be changed to another one to repeatedly execute the steps S22 et seq.

Figure 27:
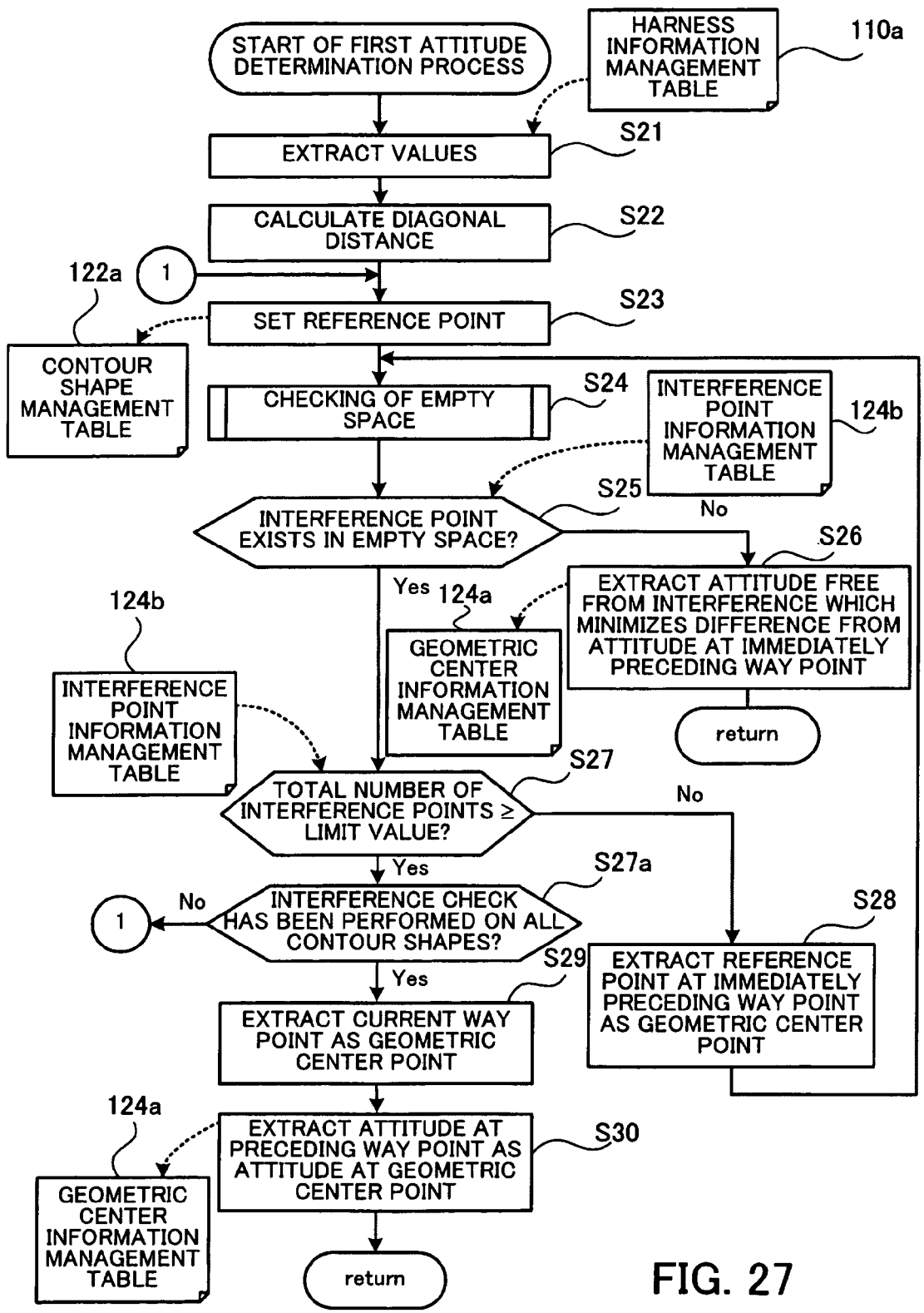
FIG. 27 is a flowchart of a variation of the first attitude determination process.

FIG. 27 is a flowchart of a variation of the first attitude determination process.

Steps S21 to S27 in the flowchart in FIG. 27 are the same as the steps S21 to S27 in FIG. 16.

If the total number of interference points is not smaller than the limit value (YES to the step S27), the cross-sectional direction determination unit 126 determines whether or not the steps S21 to S27 have been executed for all the contour shapes stored in the contour shape management table 122a (step S27a).

If the steps S21 to S27 have not been executed for all the contour shapes stored in the contour shape management table 122a (NO to the step S27a), the process returns to the step S23, and the steps S23 et seq. are executed again using the diagonal distance of another contour shape.

On the other hand, if the steps S21 to S27 have been carried out for all the contour shapes stored in the contour shape management table 122a (YES to the step S27a), the process proceeds to the step S29.

By carrying out the above-described processing, it is possible to easily extract a contour shape having a minimum number of interference points, to thereby change the initial route to a higher-accuracy route.

Further, since a check for empty space is performed at each of the way points using several contour shapes, it is possible to automatically detect whether or not the harness 20 can pass along the entire route. This makes it possible to reduce verification time.

It should be noted that the above-described processing functions (functions illustrated in FIG. 4) can be realized by a computer. In this case, a program describing details of processes to be executed using the functions provided in the design support apparatus 100 is supplied. By executing the program on the computer, the above-described processing functions are realized on the computer. The program describing the details of the processes can be recorded in a computer-readable recording medium. The computer-readable recording medium includes a magnetic recording device, an optical disk, a magneto-optical recording medium, and a semiconductor memory. The magnetic recording device includes a hard disk drive (HDD), a flexible disk (FD), and a magnetic tape. The optical disk includes a DVD (Digital Versatile Disk), a DVD-RAM (Random Access Memory), and a CD-ROM (Compact Disk Read Only Memory), and a CD-R (Recordable)/RW (ReWritable). Further, the magneto-optical recording medium includes an MO (Magneto-Optical disk).

To make the program available on the market, portable recording media, such as DVD and CD-ROM, which store the program, are sold. Further, the program can be stored in a storage device of a server computer connected to a network, and transferred from the server computer to another computer via the network.

When the design support program is executed by a computer, the program stored e.g. in a portable recording medium or transferred from the server computer is stored into a storage device of the computer. Then, the computer reads the program from the storage device of its own and executes processing based on the program. The computer can also read the program directly from the portable recording medium and execute processing based on the program. Further, the computer may also execute processing based on a program which is transferred from the server computer whenever the processing is to be carried out.

Further, although in the above-described embodiment, a cable is disposed in a product having a housing, this is not limitative, but the embodiment can also be applied to design arrangement of any of long flexible objects, such as signal lines, power lines, gas pipes, and water pipes between installed objects inside and outside a building.

As described above, according to the disclosed design support program, it is possible to easily check whether or not a route exists for disposition of an assembly including a long flexible member within an apparatus.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that various changes, substitutions, and alterations could be made hereto without departing from the spirit and scope of the invention.

What is claimed is:

1. A non-transitory computer-readable medium storing a design support program for causing a computer to perform processing for disposing a component part while taking into account a positional relationship between the component part and other installed objects existing within a space, when designing a layout within the space, wherein the design support program causes the computer to function as:

a storage unit configured to store location data of positions, in the space, of an assembly including a flexible cable and a member connected to the flexible cable and having a larger cross-sectional shape than a cross-sectional shape of the flexible cable, and location data of respective positions of the installed objects in the space;

a geometric center calculation unit configured to virtually extend straight lines from a point on a route along which the flexible cable passes, radially in directions normal to a tangential direction of the route, virtually position a group of a plurality of points at locations where the straight lines come into contact with the installed objects, and calculate a geometric center from the group of the positioned points;

a route change unit configured to change the route such that the flexible cable passes the geometric center calculated by said geometric center calculation unit; and a verification unit configured to verify whether or not the assembly interferes with any of the installed objects during passage of the flexible cable along the route changed by said route change unit.

2. The non-transitory computer-readable medium according to claim 1, wherein said geometric center calculation unit virtually extends straight lines from a point on the route changed by said route change unit, radially in directions normal to a tangential direction of the changed route, and virtually position a group of a plurality of points at locations where the straight lines come into contact with the installed objects, and wherein said verification unit verifies whether or not the assembly interferes with any of the point groups.

3. The non-transitory computer-readable medium according to claim 1, wherein the design support program causes the computer to further function as a shape extraction unit configured to extract rectangular shapes corresponding to cross sections of the assembly in respective directions of the assembly, wherein said geometric center calculation unit extracts a minimum rectangular shape from the rectangular shapes extracted by said shape extraction unit, and wherein said verification unit verifies whether or not the rectangular shape extracted by said geometric center calculation unit interferes with any of the installed objects.

4. The non-transitory computer-readable medium according to claim 3, wherein when said verification unit verifies that the minimum rectangular shape interferes with any of the installed objects, said geometric center calculation unit extracts another rectangular shape from the rectangular shapes extracted by said shape extraction unit.

5. The non-transitory computer-readable medium according to claim 1, wherein when any of the straight lines does not come into contact with any of the installed objects, said geometric center calculation unit virtually positions a point at a location where the straight line is extended from the route by a predetermined distance.

6. The non-transitory computer-readable medium according to claim 5, wherein the design support program causes the computer to further function as a shape extraction unit configured to extract rectangular shapes corresponding to cross sections of the assembly which face in respective directions of the assembly, and wherein the predetermined distance is equal to a diagonal distance of one of the rectangular shapes.

7. The non-transitory computer-readable medium according to claim 1, wherein the design support program causes the computer to further function as a passing direction determination unit configured to determine a passing direction of the member such that a travel amount of the member is minimized between two adjacent points on the route where said verification unit verifies that no interference occurs.

8. The non-transitory computer-readable medium according to claim 1, wherein the flexible cable has a linear shape, a cord shape, or a band shape.

9. The non-transitory computer-readable medium according to claim 1, wherein the design support program causes the computer to function as a shaping unit configured to form the group of points positioned by said geometric center calculation unit into a shape along the route.

10. A design support method for causing a computer to perform processing for disposing a component part while taking into account a positional relationship between the component part and other installed objects existing within a space, when designing a layout within the space, comprising:

storing location data of positions, in the space, of an assembly including a flexible cable and a member connected to the flexible cable and having a larger cross-sectional shape than a cross-sectional shape of the flexible cable, and location data of respective positions of the installed objects in the space;

virtually extending straight lines from a point on a route along which the flexible cable passes, radially in directions normal to a tangential direction of the route, virtually positioning a group of a plurality of points at locations where the straight lines come into contact with the installed objects, and calculating a geometric center from the group of the positioned points;

changing the route such that the flexible cable passes the calculated geometric center; and verifying whether or not the assembly interferes with any of the installed objects during passage of the flexible cable along the changed route.

11. A design support apparatus for performing processing for disposing a component part while taking into account a positional relationship between the component part and other installed objects existing within a space, when designing a layout within the space, comprising:

a storage unit configured to store location data of positions, in the space, of an assembly including a flexible cable and a member connected to the flexible cable and having a larger cross-sectional shape than a cross-sectional shape of the flexible cable, and location data of respective positions of the installed objects in the space;

a geometric center calculation unit configured to virtually extend straight lines from a point on a route along which the flexible cable passes, radially in directions normal to a tangential direction of the route, virtually position a group of a plurality of points at locations where the straight lines come into contact with the installed objects, and calculate a geometric center from the group of the positioned points;

a route change unit configured to change the route such that the flexible cable passes the geometric center calculated by said geometric center calculation unit; and a verification unit configured to verify whether or not the assembly interferes with any of the installed objects during passage of the flexible cable along the route changed by said route change unit.

* * * * *